(12) United States Patent
Kawano et al.

(10) Patent No.: US 10,571,024 B2
(45) Date of Patent: *Feb. 25, 2020

(54) COMBINATION OIL RING

(71) Applicant: TPR CO., LTD., Tokyo (JP)

(72) Inventors: Kentaro Kawano, Tokyo (JP); Seiji Tamaki, Tokyo (JP)

(73) Assignee: TPR CO., LTD., Tokyo (JP)

( * ) Notice: Subject to any disclaimer, the term of this patent is extended or adjusted under 35 U.S.C. 154(b) by 51 days.

This patent is subject to a terminal disclaimer.

(21) Appl. No.: 16/061,123

(22) PCT Filed: Jul. 24, 2017

(86) PCT No.: PCT/JP2017/026699
§ 371 (c)(1),
(2) Date: Jun. 11, 2018

(87) PCT Pub. No.: WO2019/008780
PCT Pub. Date: Jan. 10, 2019

(65) Prior Publication Data
US 2019/0360585 A1 Nov. 28, 2019

(30) Foreign Application Priority Data

Jul. 5, 2017 (WO) .................. PCT/JP2017/024712

(51) Int. Cl.
*F16J 9/20* (2006.01)
*F16J 9/06* (2006.01)
*F16J 9/26* (2006.01)

(52) U.S. Cl.
CPC ................ *F16J 9/20* (2013.01); *F16J 9/068* (2013.01); *F16J 9/26* (2013.01)

(58) Field of Classification Search
CPC .......... F16J 9/06; F16J 9/20; F16J 9/26; F16J 9/206; F16J 9/203; F16J 9/067; F16J 9/066; F16J 9/068; F02F 5/00
See application file for complete search history.

(56) References Cited

U.S. PATENT DOCUMENTS

| 2,614,899 A | 10/1952 | Phillips |
| 2,712,971 A | 7/1955 | Phillips |
| 5,820,131 A | 10/1998 | Tanaka et al. |

(Continued)

FOREIGN PATENT DOCUMENTS

| CN | 1494641 A | 5/2004 |
| CN | 1708656 A | 12/2005 |

(Continued)

OTHER PUBLICATIONS

Office Action for Korean Patent Application No. 10-2018-7012173, dated May 10, 2018.

(Continued)

*Primary Examiner* — Vishal A Patel
(74) *Attorney, Agent, or Firm* — Merchant & Gould P.C.

(57) ABSTRACT

Provided is an oil ring. A shape of an outer peripheral surface of an upper segment arranged on an engine combustion chamber side has a symmetrical curved shape. A shape of an outer peripheral surface of a lower segment arranged on a side away from the engine combustion chamber is a symmetrical curved shape.

3 Claims, 10 Drawing Sheets

(56) References Cited

U.S. PATENT DOCUMENTS

| | | | | |
|---|---|---|---|---|
| 5,836,280 | A | * | 11/1998 | Miyazawa ............ C23C 30/00 123/193.4 |
| 7,077,402 | B2 | | 7/2006 | Katumaru et al. |
| 7,306,232 | B2 | * | 12/2007 | Fiedler .................. F16J 9/206 277/434 |
| 7,354,045 | B2 | | 4/2008 | Abe et al. |
| 7,396,018 | B1 | * | 7/2008 | Fiedler .................. F16J 9/206 277/434 |
| 7,431,305 | B2 | * | 10/2008 | Fiedler .................. F16J 9/203 277/435 |
| 8,371,585 | B2 | | 2/2013 | Esser et al. |
| 8,403,334 | B2 | * | 3/2013 | Lahrman ................ F16J 9/064 277/434 |
| 8,973,262 | B2 | | 3/2015 | Esser et al. |
| 9,638,321 | B2 | | 5/2017 | Meyer et al. |
| 9,784,369 | B2 | | 10/2017 | Fujita et al. |
| 2004/0061291 | A1 | | 4/2004 | Takiguchi et al. |
| 2006/0006604 | A1 | | 1/2006 | Abe et al. |
| 2008/0122185 | A1 | | 5/2008 | Katou |
| 2008/0252902 | A1 | * | 10/2008 | Oya ........................ F16J 9/14 356/614 |
| 2010/0176557 | A1 | | 7/2010 | Peter-Klaus et al. |
| 2011/0100318 | A1 | | 5/2011 | Higuchi et al. |
| 2014/0062030 | A1 | | 3/2014 | Hitosugi et al. |
| 2014/0165826 | A1 | | 6/2014 | Baerenreuter et al. |
| 2014/0311437 | A1 | * | 10/2014 | Lopez .................... F16J 9/206 123/193.1 |
| 2015/0093586 | A1 | | 4/2015 | Kawai et al. |
| 2015/0130143 | A1 | | 5/2015 | Meyer et al. |
| 2016/0076649 | A1 | | 3/2016 | Fukuma et al. |
| 2017/0175893 | A1 | | 6/2017 | Fujita et al. |
| 2017/0227126 | A1 | | 8/2017 | Kawasaki et al. |

FOREIGN PATENT DOCUMENTS

| | | |
|---|---|---|
| CN | 101191556 A | 6/2008 |
| CN | 101403348 A | 4/2009 |
| CN | 101680545 A | 3/2010 |
| CN | 103670777 A | 3/2014 |
| CN | 104080941 A | 10/2014 |
| CN | 104214004 A | 12/2014 |
| CN | 105849444 A | 8/2016 |
| DE | 4429649 A1 | 2/1996 |
| DE | 19755425 A1 | 6/1999 |
| EP | 0927840 A1 | 7/1999 |
| FR | 2723401 A1 | 2/1996 |
| JP | S57-63951 U | 4/1982 |
| JP | H07-239032 A | 9/1995 |
| JP | H09-210203 A | 8/1997 |
| JP | 2002-323133 A | 11/2002 |
| JP | 2003-049705 A | 2/2003 |
| JP | 4322500 B | 9/2009 |
| JP | 4322500 B2 | 9/2009 |
| JP | 2010-031835 A | 2/2010 |
| JP | 2010-530045 A | 9/2010 |
| JP | 4800946 B | 10/2011 |
| JP | 4800946 B2 | 10/2011 |
| JP | 6833276 B1 | 12/2015 |
| JP | 2016-056935 A | 4/2016 |
| JP | 2016-169791 A | 9/2016 |
| JP | 6122901 B | 4/2017 |
| KR | 10-2016-0095194 A | 8/2016 |
| WO | 2016/038916 A1 | 3/2016 |
| WO | 2016/143315 A1 | 9/2016 |

OTHER PUBLICATIONS

International Search Report for PCT/JP2017/026699, dated Oct. 24, 2017.

Nakayama et al., "The Effect of Oil Ring Geometry on Oil Film Thickness in the Circumferential Direction of the Cylinder" Society of Automotive Engineers, Inc.: 1-7 (1998).

Office Action for Chinese Patent Application No. 201580002991.X (dated Apr. 18, 2017).

Office Action for Chinese Patent Application No. 201780005094.3 (dated Jul. 23, 2019).

Kazuya Mochizuki et al. "A study on Oil-Ring Conformability to Cylinder Bore (1st Report)" Automotive technology of JSME/ automotive technology series, vol. 44, No. 2, 2013, pp. 7-12.

Kei Nakayama, et al. "The Effect of Oil Ring Geometry on Oil Film Thickness in the Circumferential Direction of the cylinder" Society of Automotive Engineers, Inc., 1998, pp. 1-7.

International Search Report corresponding to Application No. PCT/JP2015/059962; dated Jun. 23, 2015, with English Translation.

State Intellectual Property Office of People's Republic of China Notification of the First Office Action corresponding to Application No. 201580002991.X; dated Apr. 18, 2017.

* cited by examiner

COMBINATION OIL RING

This application is a National Stage of International Patent Application No. PCT/JP2017/026699, filed Jul. 24, 2017, which claims benefit of International Patent Application No. PCT/JP2017/024712, filed Jul. 5, 2017, which applications are incorporated herein by reference. To the extent appropriate, a claim of priority is made to each of the above disclosed applications.

TECHNICAL FIELD

The present invention relates to a combination oil ring, which is to be attached to an oil ring groove of a piston.

BACKGROUND ART

A piston ring is attached to a piston ring groove formed in an outer periphery of a piston of an internal combustion engine. A piston ring for use in a typical gasoline internal combustion engine has a configuration including two compression rings (top ring and second ring) and a combination oil ring. The combination oil ring has an oil-control function, and is configured to suppress consumption of engine oil.

In general, for the purpose of reducing an oil consumption, in a combination oil ring including two segments (side rails) and an expander spacer (spacer expander), there has been employed a general method of increasing an oil ring tension, or a method of increasing a drop (distance μm in a radial direction), without increasing the oil ring tension, from a vertex SP of an outer peripheral surface S (hereinafter referred to as "outer periphery vertex") in a certain-length measurement-width so as to maintain a narrow contact width between an outer peripheral slide surface of the segment and a bore in an axial direction in an outer peripheral shape of the segment. Generally, the oil-control performance of the oil ring is indicated by a surface pressure (JIS B8032-13) which is calculated based on an oil ring tension (tangential tension) and a width h1 of the segment. However, the width of the segment is herein replaced with the contact width h2 between the outer peripheral slide surface of the segment and the bore in the axial direction, and the surface pressure is hereinafter referred to as "actual surface pressure". The actual surface pressure is determined by following equation (1) described below, where a bore diameter is represented by d (mm), an oil ring tension is represented by Ft (N), a contact width between the outer peripheral slide surface of the segment and the bore in the axial direction is represented by h2 (mm), and the actual surface pressure is represented by P (N/mm$^2$).

$$P = Ft/(d \cdot h2) \quad (1)$$

When the contact width h2 of the segment with the bore at the time of actual sliding is small, the actual surface pressure P increases in Equation (1) described above, thereby being capable of reducing the oil consumption. Further, increase in oil ring tension Ft causes increase in actual surface pressure P according to Equation (1) described above, thereby being capable of reducing the oil consumption. However, the use of means for reducing the oil consumption may induce increase in friction.

There has been known the following related-art documents relating to such oil ring. In Patent Literature 1, there are disclosed the following inventions of an oil scraper ring. With regard to two discs (side rails or segments) of an oil ring, the two discs are the same, and each have a running surface (distal end outer peripheral surface of the segment) having an asymmetrical convex shape. In one case, vertex lines of the outer peripheral surfaces of the two discs are oriented toward a center of a ring groove. In another case, the vertex lines of the outer peripheral surfaces of the two discs are oriented toward side surfaces opposite to a piston top of the ring groove. Further, a cross section of the running surface of the disc has an asymmetrical shape of a polynomial of the second order expressed by h(x)=ax+bx$^2$ in a first section (I), and after passing a supporting vertex (II) h(x=0) configured as an edge, an asymmetrical shape of the function h(x)=cx$^2$ in a third section (III), thereby improving an oil-scraping action.

In Patent Literature 2, it is disclosed that a rail outer peripheral surface of an oil ring having a substantially I-shaped cross section, which is formed by coupling upper and lower rails to each other with a web, has an asymmetrical barrel-curved surface with a vertex formed at a lower part in the axial direction from a width center in the rail axial direction, and a friction loss force by a single-cylinder motoring tester is reduced.

CITATION LIST

Patent Literature

[PTL 1] JP 4800946 B1
[PTL 2] JP 4322500 B1

SUMMARY OF INVENTION

Technical Problem

In recent years, in order to achieve reduction of fuel consumption of an engine, there has been advancement in reduction of a tension of the piston ring for the purpose of reduction of friction, and advancement in a technology of forming an abrasion-resistant coating of low friction on an outer peripheral surface. The tension reduction of the oil ring may cause increase in thickness of the oil film in a high-speed range with high-speed rotation of the engine. Therefore, there arises a problem of increase in oil consumption. With regard to a standard of the oil ring tension, through substitution of a value Ft/d (unit: N/mm) which is obtained by dividing an oil ring tension Ft (unit: N) by a bore diameter d (unit: mm), that is, an oil ring tension per bore diameter, the conventional level falls within the range of 0.5 to 0.6 (N/mm), and it has been considered that the reduced tension level is equal to or less than 0.35 (N/mm).

Therefore, on the condition of low oil ring tension, there has been invented a combination of an outer peripheral shape of a segment that is aimed for controlling the thickness of the oil film to be thinner so as to suppress increase in oil consumption and an outer peripheral shape of a segment that contributes to reduction of friction, and an oil consumption measurement test and a friction measurement test with use of a crank-type single-cylinder motoring tester (floating liner type) were conducted.

The present invention has been made in view of the above-mentioned circumstances, and has an object to provide a combination oil ring, which is capable of reducing the oil consumption in a high-speed range with high-speed rotation of an engine on the condition of low oilring tension, and also of reducing friction caused by sliding of the oil ring.

Solution to Problem

In order to achieve the above-mentioned object, according to a first embodiment of the present invention, there is provided a combination oil ring, which is to be mounted to an oil ring groove of a piston for an internal combustion engine, the combination oil ring including: a pair of segments each having an outer peripheral surface which slides on a cylinder inner wall; and an expander spacer, which is arranged between the pair of segments, and is configured to press outer peripheral surfaces of the pair of segments against the cylinder inner wall, wherein a shape of the outer peripheral surface of an upper segment of the pair of segments which is arranged on the engine combustion chamber side in any longitudinal section has a curved shape, which is formed of a pair including the engine combustion chamber side and a side away from the engine combustion chamber in an upper segment width direction and is symmetrical over a radial direction extending from end points at outer peripheral side end portions of two surfaces forming the upper segment width to the cylinder inner wall respectively, and the outer periphery vertex side of the shape of the outer peripheral surface to be brought into contact with the inner wall of the cylinder at the time of insertion has an asymmetrical shape in the upper segment width direction over the outer periphery vertex, and extensions at both ends of the asymmetrical shape have a shape continuous to the curved shape having the outer peripheral side end portions of the two surfaces forming the upper segment width as end points, wherein the asymmetrical shape has a first intermediate line being a line passing through a center of an upper segment width, and, in an outer periphery distal end portion of a contour curve which is obtained by tracing the outer peripheral surface of the upper segment in the longitudinal section, when a position on the engine combustion chamber side of two positions on the contour curve at a position away by a distance of 4.0 µm from an outer peripheral vertex from the outer periphery vertex toward the inner peripheral side in the upper segment radial direction is a first position (a1), a position on the side away from the engine combustion chamber is a second position (b1), a length of a line segment between the first position a1 and the second position b1 is L, and an intermediate line of the line segment having the length L is a second intermediate line, the second intermediate line is positioned on the side away from the engine combustion chamber with respect to the first intermediate line, and an outer periphery vertex of the upper segment is positioned on the second intermediate line or on the side away from the engine combustion chamber with respect to the second intermediate line, wherein the upper segment is mounted to the oil ring groove so that the outer periphery vertex is positioned on the side away from the engine combustion chamber, wherein a shape of the outer peripheral surface of a lower segment of the pair of segments which is arranged on the side away from the engine combustion chamber in any longitudinal section has a curved shape, which is formed of a pair including the engine combustion chamber side and the side away from the engine combustion chamber in a lower segment width direction and is symmetrical over a radial direction extending from end points at outer peripheral side end portions of two surfaces forming the lower segment width to the cylinder inner wall respectively, wherein the outer periphery vertex side of the shape of the outer peripheral surface to be brought into contact with the inner wall of the cylinder at the time of insertion has an arc shape which is symmetrical in the lower segment width direction over the outer periphery vertex, wherein extensions at both ends of the arc shape have a shape continuous to the curved shape having the outer peripheral side end portions of the two surfaces forming the lower segment width as end points, and the lower segment is attached to the oil ring groove, wherein, when the contour curve having the asymmetrical shape in the upper segment outer periphery distal end portion is divided into two regions including a contour curve portion which extends toward the inner peripheral side in the upper segment radial direction and is sandwiched between the outer periphery vertex and a position away from the outer periphery vertex by a distance of 1.5 µm and a contour curve portion which extends toward the inner peripheral side in the upper segment radial direction and is sandwiched by a distance of 1.5 µm and a distance of 4.0 µm from the outer periphery vertex, the contour curve has a first contour section, a second contour section, and a third contour section in the stated order from the engine combustion chamber side of the cylinder, and the first contour section is provided at a part of a linear shape or a quadratic curve shape starting from a first end portion on the engine combustion chamber side of the second contour section, and the second contour section is provided so as to be an arc shape and has an outer periphery vertex at a halfway portion thereof, and the third contour section is provided so as to be part of the quadratic curve shape starting from the second end portion of the second contour section on the side away from the engine combustion chamber, wherein a surface roughness of an asymmetrical shape portion of the outer peripheral surface of the upper segment is equal to or less than 0.1 µmRa, wherein, in an outer periphery distal end portion of the contour curve, of two positions on the contour curve at a position away from the outer periphery vertex by a distance of 1.5 µm toward the inner peripheral side in the upper segment radial direction, a position on the engine combustion chamber side is a third position (a2), and a length L of the line segment between the first position a1 and the second position b1 falls within a range of 0.05 mm≤L≤0.18 mm, wherein, when an angle (upper angle) formed between a first straight line passing through the first position a1 and the third position a2 and an axial direction of the cylinder is θ1 degrees, and an angle (lower angle) formed between a second straight line passing through the second position b1 and the fourth position b2 and the axial direction of the cylinder is θ2 degrees, conditions of 3 degrees≤θ1≤9 degrees and 9 degrees≤θ2 are satisfied, wherein, of the outer peripheral surface of the lower segment, a surface roughness of the symmetrical portion which extends from the outer periphery vertex at least by a distance of 10 µm toward the inner peripheral side in the lower segment radial direction is equal to or less than 0.1 µmRa, wherein, in the outer periphery distal end portion of the contour curve which is obtained by tracing the outer peripheral surface of the lower segment in the longitudinal section, of two positions on the contour curve at a position away by a distance of 4.0 µm from the outer periphery vertex toward the inner peripheral side in the lower segment radial direction, a position on the engine combustion chamber side is a fifth position (a1x), and a side on the side away from the engine combustion chamber is a sixth position (b1x), and, of two positions on the contour curve at a position away by a distance of 1.5 µm from the outer periphery vertex toward the inner peripheral side in the lower segment radial direction, a position on the engine combustion chamber side is a seventh position (a2x), and a position on the side away from the engine combustion chamber is an eighth position (b2x), and a length of a line segment between the fifth position a1x and the sixth position b1x is Lx, the length Lx falls within the range of 0.08 mm≤Lx≤0.20 mm, and wherein, when an angle (upper angle) formed between a first straight line passing through the fifth position a1x and the seventh position a2x and the axial direction of the cylinder is θ1x degrees, and an angle (lower angle) formed between a second straight line passing through the sixth position b1x and the eighth position b2x and the axial direction of the cylinder is θ2x degrees, conditions of 2 degrees≤θ1x≤9 degrees, 2 degrees≤θ2x≤9 degrees, and |θ1x−θ2x|≤1.5 degrees are satisfied.

According to a second aspect of the present invention, it is preferred that, at the outer periphery distal end portion of the contour curve obtained by tracing the outer peripheral surface of the lower segment in the longitudinal section, the length Lx fall within the range of 0.08 mm≤Lx≤0.18 mm, and conditions of 3 degrees≤θ1x≤9 degrees, 3 degrees≤θ2x≤9 degrees, and |θ1x−θ2x|≤1.5 degrees be satisfied.

According to a third aspect of the present invention, it is preferred that the outer peripheral surface of each of the pair of segments include a coating of any one of:

(1) a coating made of chromium nitride, the coating having a surface hardness of equal to or more than 800 HV and a thickness of equal to or more than 10 μm;

(2) a DLC (amorphous carbon) coating made of only carbon, the DLC coating having a surface hardness of equal to or more than 1,500 HV and a thickness of equal to or more than 3 μm; and (3) a multi-layer structure coating including the hard coating of (1) and the DLC coating of (2) layered on the hard coating, the coating of the chromium nitride coating (PVD coating) having a thickness of equal to or more than 5 μm, and the coating of the DLC coating having a thickness of equal to or more than 0.5 μm.

Advantageous Effects of Invention

According to the present invention, there may be provided the combination oil ring which is capable of reducing the oil consumption in the high-speed range with high-speed rotation of the engine even on the condition of low oilring tension, and also of reducing the friction caused by the sliding of the oil ring.

DESCRIPTION OF EMBODIMENTS

Now, with reference to the drawings, a combination oil ring 10 according to embodiments of the invention is described.

<1. Configuration of Combination Oil Ring 10>

Figure 1:
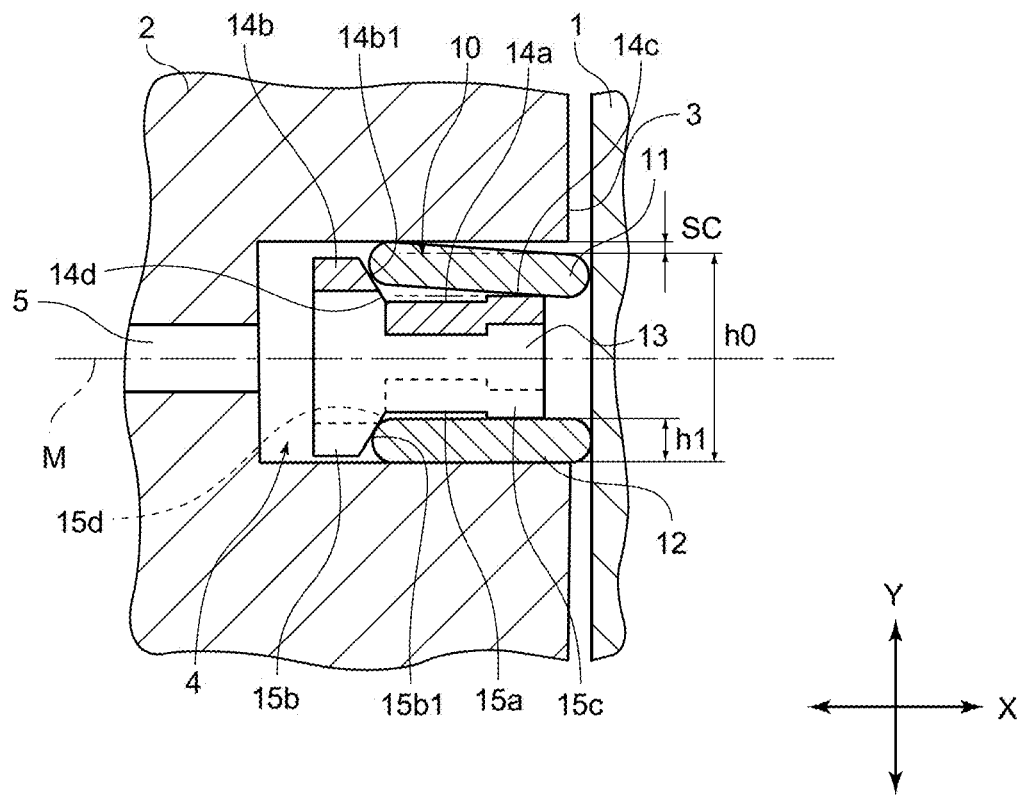
FIG. 1 is a longitudinal sectional view for illustrating a configuration of a combination oil ring according to one embodiment of the present invention, and is an illustration of a state in which a piston having the combination oil ring attached thereto is inserted to a cylinder.

FIG. 1 is a longitudinal sectional view for illustrating a configuration of the combination oil ring 10, and is an illustration of a state in which a piston 2 having the combination oil ring 10 attached thereto is inserted to a cylinder 1.

In FIG. 1, the piston 2 which is reciprocable is arranged in the cylinder 1 of an engine of, for example, an automobile. An outer peripheral surface 3 of the piston 2 has two or three annular grooves (illustration of one or two grooves on an engine combustion chamber side is omitted). Among the above-mentioned grooves, an oil ring groove 4 is formed on a crankshaft side (not shown) that is most apart from the engine combustion chamber. The oil ring groove 4 has an oil return hole 5, and the combination oil ring 10 is attached to the oil ring groove 4. The combination oil ring 10 has an oil-control function, and is configured to cause engine oil on an inner wall of the cylinder 1 to be formed into an oil film having an appropriate thickness.

As illustrated in FIG. 1, the combination oil ring 10 is a combination oil ring of a three-piece type, and is made of steel being a main component. The combination oil ring 10 includes a pair of segments (side rails) 11 and 12 and an expander spacer 13 arranged therebetween. As illustrated in FIG. 1, the pair of segments 11 and 12 each have a predetermined segment width h1. The segment width h1 herein represents a dimension of each of the upper segment 11 and the lower segment 12 in an axial direction (Y-direction) of the cylinder 1, and are typically equal. Further, the pair of segments 11 and 12 are arranged so as to have a combination width h0. The combination width h0 herein represents a distance between an upper surface of the upper segment 11 (surface on the engine combustion chamber side) and a lower surface of the lower segment 12 (surface on the side away from the engine combustion chamber). Further, the upper segment 11 is arranged so as to have a gap by a side clearance SC with respect to an upper wall of the oil ring groove 4 on the engine combustion chamber side. The side clearance SC represents a dimensional difference between an oil ring groove width and the combination width h0. Typically, when a bore diameter d of a cylinder falls within a range of from 50 mm to 100 mm, there are given a combination width h0 of from 1.5 mm to 3.0 mm, a segment width h1 of from 0.30 mm to 0.5 mm, and a side clearance SC of from 0.07 to 0.15 mm.

Figure 2:
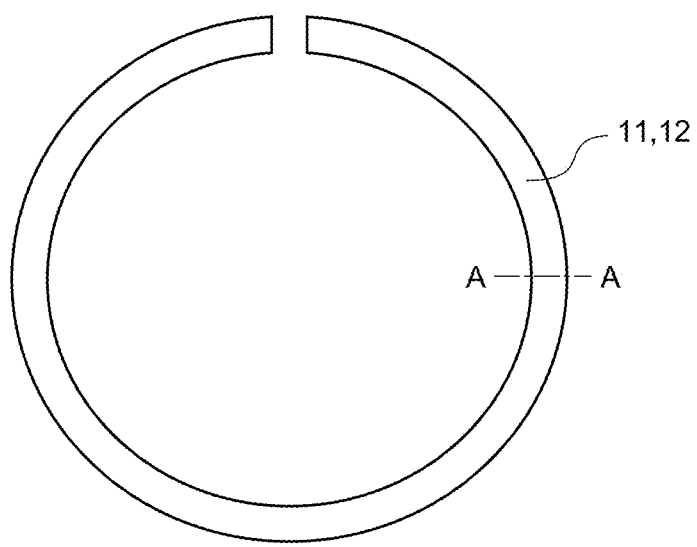
FIG. 2 is a plan view for illustrating an outer appearance of segments.
Figure 3:
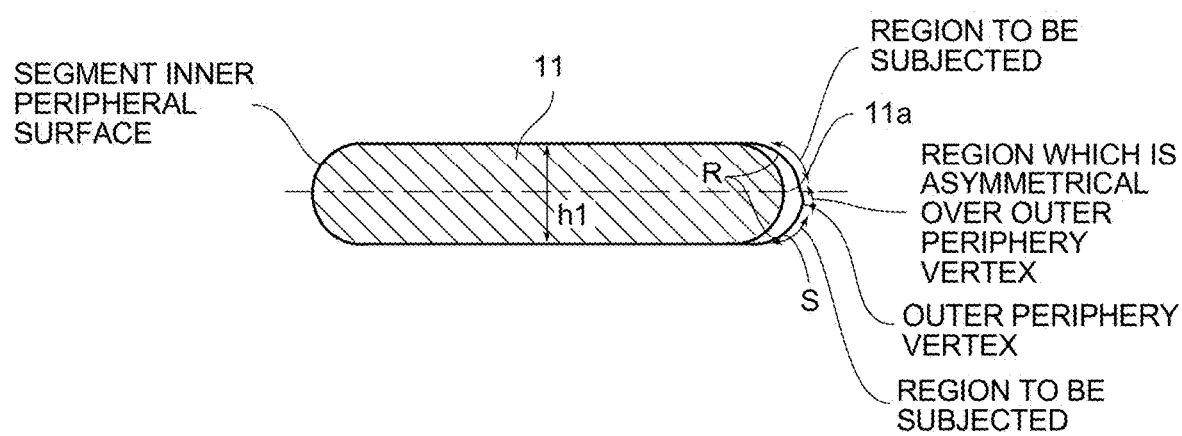
FIG. 3 is a longitudinal sectional view for illustrating an upper segment 11 to be arranged on an engine combustion chamber side, which is taken along the line A-A of FIG. 2.
Figure 4:
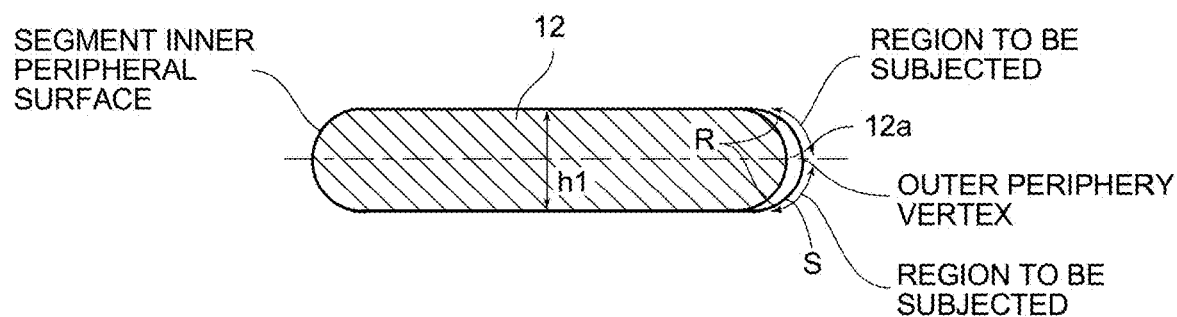
FIG. 4 is a longitudinal sectional view for illustrating a lower segment 12 to be arranged on a side away from the engine combustion chamber, which is taken along the line A-A of FIG. 2.

FIG. 2 is a plan view for illustrating an outer appearance of the segments 11 and 12. FIG. 3 is a longitudinal sectional view for illustrating the upper segment 11 to be arranged on the engine combustion chamber side, which is taken along the line A-A of FIG. 2. FIG. 4 is a longitudinal sectional view for illustrating the lower segment 12 to be arranged on the side away from the engine combustion chamber, which is taken along the line A-A of FIG. 2. As illustrated in FIG. 2, the segments 11 and 12 each have an annular outer appearance. Each of the segments 11 and 12 have end surfaces in a circumferential direction, which are opposed to each other with a small gap at an abutment. Further, as illustrated in FIG. 3 and FIG. 4, the segments 11 and 12 have hard coating 11a and 12a for improving the abrasion resistance and low-friction characteristic on the peripheral surface S side, respectively. The shapes of the distal end portions SA of the outer peripheral surfaces S of the segments 11 and 12 are described later. Further, specific materials of the hard coating 11a and 12a and forming methods for the hard coating 11a and 12a are also described later.

Figure 5:
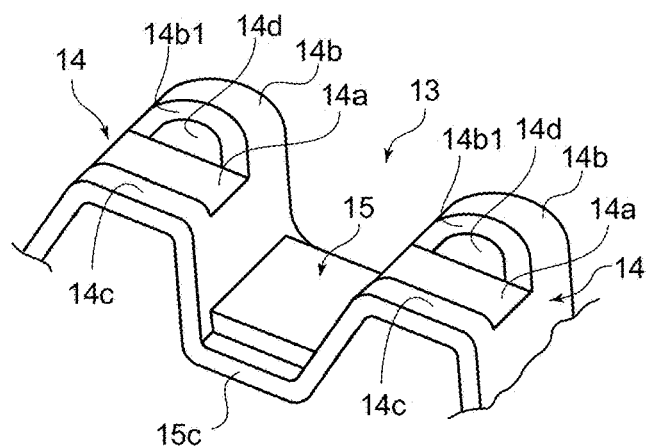
FIG. 5 is a perspective view for illustrating a configuration of an expander spacer.

FIG. 5 is a perspective view for illustrating a configuration of the expander spacer 13. As illustrated in FIG. 5, the expander spacer 13 is provided so as to have a corrugated shape so that the expander spacer 13 is alternately directed toward the upper segment 11 or the lower segment 12 as proceeding along the circumferential direction of the expander spacer 13. With the expander spacer 13 having such a corrugated shape, a gap is formed between the upper segment 11 and the lower segment 12, thereby securing a passage for engine oil.

The expander spacer 13 has an annular outer appearance, and is attached to the oil ring groove 4 together with the two segments under a state in which end surfaces of the expander spacer 13 in the circumferential direction are held in abutment against each other. As a result, a circumferential direction length (free height) of the expander spacer 13 serving as a compression spring set before being inserted to the cylinder 1 in a free state is reduced by an amount corresponding to a set flexure, thereby generating an oil ring tension Ft of the combination oil ring 10.

In the following, portions of the expander spacer 13 which are positioned on the engine combustion chamber side with respect to a center line M of the cylinder 1 in the axial direction are referred to as upper projection portions 14, and portions which are positioned on the side away from the engine combustion chamber with respect to the center line M are referred to as lower projection portions 15. The upper projection portions 14 and the lower projection portions 15 continue repeatedly in a periodical manner in the circumferential direction of the expander spacer 13, thereby forming a plurality of corrugated portions in the expander spacer 13.

The upper projection portions 14 and the lower projection portions 15 are formed into the corrugated shape by performing plastic working to the expander spacer 13. Further, the upper projection portions 14 each have an upper piece portion 14a, an ear portion 14b, and an outer peripheral support portion 14c. The upper piece portion 14a is a portion to be opposed to the upper segment 11, and is formed so as to be substantially horizontal. However, the upper piece portion 14a is not limited to this configuration. For example, a recess groove may be formed so as to extend from a center position of the outer peripheral support portion 14c in the circumferential direction toward a center position of the ear portion 14b in the circumferential direction. Further, not limited to the corrugated shape in which the upper and lower projection portions are formed alternately with respect to the axial direction of the cylinder 1, the expander spacer 13 may have the following shape. That is, in the radial direction of the expander spacer 13, the ear portions are formed on the inner peripheral side, and support portions for the segments are formed on the outer peripheral side. The upper projection portions and the lower projection portions are formed so as to be symmetrical over the center line M. The ear portions and the support portions for the segments are formed alternately in the circumferential direction.

Further, the ear portions 14b are positioned on the inner peripheral side with respect to the upper piece portion 14a, and project toward the engine combustion chamber side with respect to the upper piece portion 14a (in the direction away from the center line M). On the outer peripheral side of the ear portion 14b, there is formed an inclined surface 14b1 which is inclined with respect to the axial direction of the cylinder 1, and the inclined surface 14b1 is inclined so as to extend toward the outer peripheral side as approaching the center line M from a projecting distal end portion. A part of the upper segment 11 on the inner peripheral side is brought into abutment against the inclined surface 14b1. Typically, an inclination angle of the inclined surface 14b1 is set within a range of from 5 degrees to 30 degrees with respect to a plane orthogonal to the center line M, and may be 0 degrees. Thus, a part of the upper segment 11 on the inner peripheral side opposed at the inclination angle of the inclined surface 14b1 is brought into abutment against the inclined surface 14b1.

At a boundary portion between the ear portion 14b and the upper piece portion 14a, there is formed a communication hole 14d for allowing engine oil to flow therethrough. However, a configuration having no communication hole 14d may also be employed.

Further, the outer peripheral support portion 14c is positioned on the outer peripheral side with respect to the upper piece portion 14a. The outer peripheral support portion 14c is formed so as to project toward the engine combustion chamber side (in the direction away from the center line M) with respect to the upper piece portion 14a. The outer peripheral support portion 14c is a portion which is configured to support, on an upper surface side thereof, the upper segment 11. Therefore, the outer peripheral support portion 14c projects less than the ear portion 14b, and an upper surface thereof is formed so as to be substantially horizontal.

Further, in FIG. 1, the lower projection portion 15 is formed so as to have a symmetrical shape with respect to the upper projection portion 14 over the center line M interposed therebetween, and is provided adjacent to the upper projection portion 14 in the circumferential direction. Therefore, the lower projection portions 15 also has a lower piece portion 15a having a symmetrical shape with respect to the upper piece portion 14a, an ear portion 15b having a symmetrical shape with respect to the ear portion 14b, and an outer peripheral support portion 15c having a symmetrical shape with respect to the outer peripheral support portion 14c. Further, the ear portion 15b has an inclined surface 15b1 against which a part of the lower segment 12 on the inner peripheral side is brought into abutment, and the inclined surface 15b1 is inclined so as to extend toward the outer peripheral side as approaching the center line M. A part of the lower segment 12 on the inner peripheral side is brought into abutment against the inclined surface 15b1. Typically, an inclination angle of the inclined surface 15b1 is set within a range of from 5 degrees to 30 degrees with respect to a plane orthogonal to the center line M, and may be 0 degrees. Thus, a part of the lower segment 12 on the inner peripheral side opposed at the inclination angle of the inclined surface 15b1 is brought into abutment against the inclined surface 15b1.

At a boundary portion between the ear portion 15b and the lower piece portion 15a, there is formed a communication hole 15d for allowing engine oil to flow therethrough. However, a configuration having no communication hole 15d may also be employed.

At the outer peripheral support portion 15c, the lower segment 12 is supported on a lower surface side of the outer peripheral support portion 15c (surface on the crankshaft side). Therefore, the upper segment 11 and the lower segment 12 are supported in a state of being separated apart from each other in the axial direction of the cylinder 1. When the combination oil ring 10 is inserted to the cylinder 1 under a state in which the pair of segments 11 and 12 and the expander spacer 13 arranged therebetween are attached to the oil ring groove 4 of the piston 2, the expander spacer 13 generates a compression stress under a state in which end surfaces of the expander spacer 13 in the circumferential direction are held in abutment against each other, and the oil ring tension Ft is measured. Further, the upper segment 11 and the lower segment 12 are pressed by the inclined surfaces 14b1 and the inclined surfaces 15b1, respectively. As a result, the distal end portions SA of the outer peripheral surfaces S of the segments 11 and 12 are pressed to the inner peripheral surface of the cylinder 1. With this action, engine oil on an inner wall of the cylinder 1 can be formed into an oil film having an appropriate thickness.

<2. Shapes of Outer Peripheral Surfaces S of Upper Segment 11 and Lower Segment 12>

Next, shapes of the outer peripheral surfaces S of the segment 11 and 12 in longitudinal section are described. The outer peripheral surface S of the upper segment 11 arranged on the engine combustion chamber side has a shape as illustrated in FIG. 3. Specifically, the outer peripheral surface S of the upper segment 11 has a curved shape, which is a symmetrical shape formed of a pair of the engine combustion chamber side and the side away from the engine combustion chamber in the segment width and is symmetrical over a radial direction extending from end points at outer peripheral side end portions of two opposed surfaces forming the segment width to the cylinder inner wall, respectively. The outer peripheral surface S of the upper segment 11 has a continuous curved shape in which the outer periphery vertex side of the outer peripheral shape in contact with the inner wall at the time of insertion to the cylinder has an asymmetrical shape in the segment width direction over the outer periphery vertex of the segment, and the outer peripheral surface which is not on the outer periphery vertex side is symmetrical.

The outer peripheral surface S of the lower segment 12 arranged on the side away from the engine combustion chamber has a shape as illustrated in FIG. 4. Specifically, the outer peripheral surface S of the lower segment 12 has a curved shape, which is a symmetrical shape formed of a pair of the engine combustion chamber side and the side away from the engine combustion chamber in the segment width and is symmetrical over a radial direction extending from end points at outer peripheral side end portions of two surfaces forming the segment width to the cylinder inner wall, respectively. The outer peripheral surface S of the lower segment 12 has a continuous arc shape formed in a curved shape in which the outer periphery vertex side of the outer peripheral shape in contact with the inner wall at the time of insertion to the cylinder has a symmetrical shape in the segment width direction over the outer periphery vertex, and the outer peripheral surface which is not on the outer periphery vertex side is symmetrical. That is, the outer peripheral surface S is symmetrical over the segment width center line in the entire region. The segment width center line is traced so that a contour curve of the outer peripheral surface in any longitudinal section of the segment has a pair of symmetrical shape formed of end points of outer peripheral side end portions of two surfaces forming the segment width at the inner peripheral side position of the segment in the radial direction, and the symmetry axis of the pair of symmetrical shapes may be set as the segment width center line.

<2-1. Shape of Outer Peripheral Surface S of Upper Segment 11>

Figure 6:
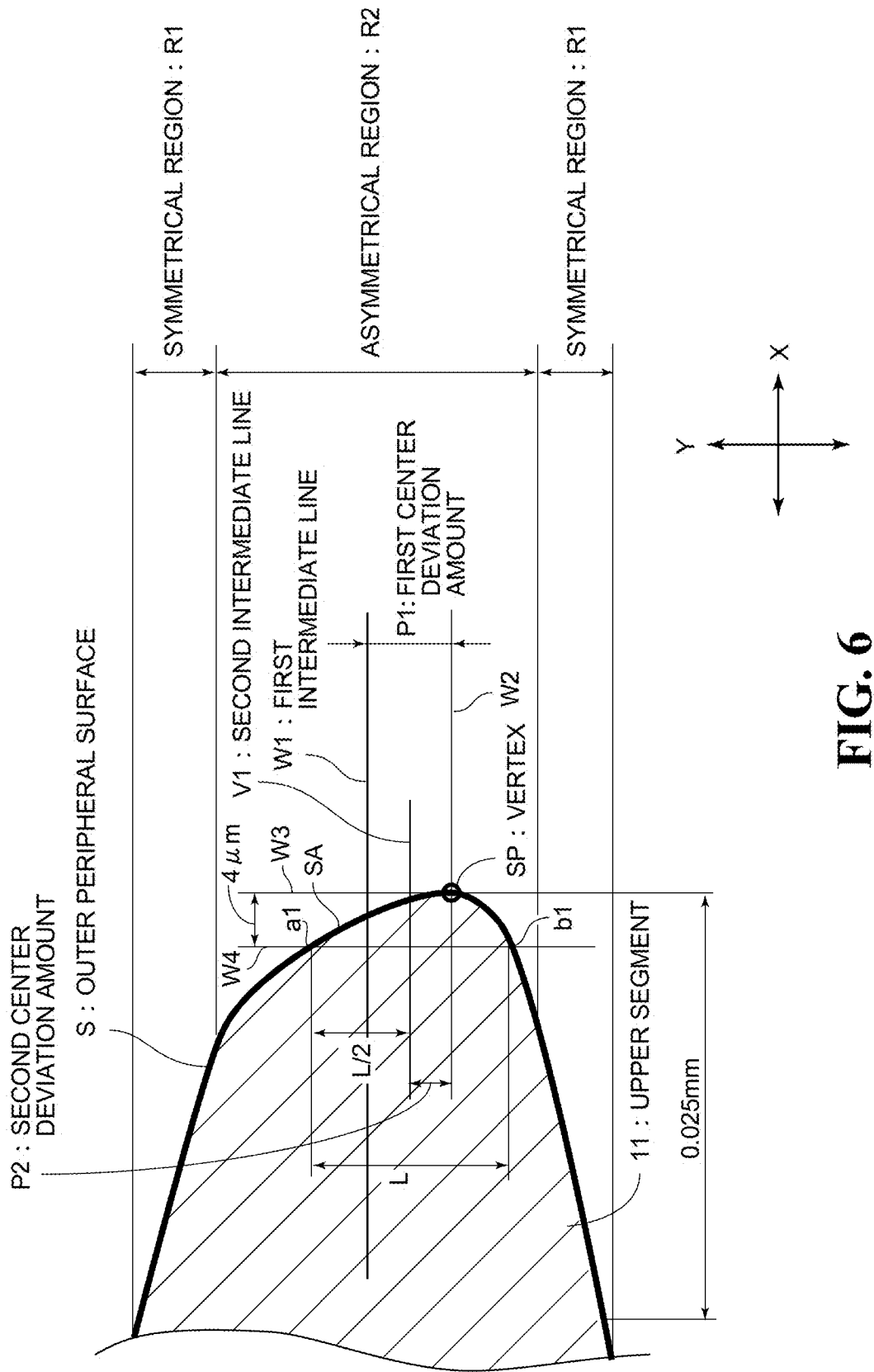
FIG. 6 is an illustration of a partial contour curve representing a shape of an outer peripheral surface of the upper segment 11 to be arranged on the engine combustion chamber side.

First, the asymmetrical shape of the outer peripheral surface S of the upper segment 11 is described. FIG. 6 is an illustration of a partial contour curve representing a shape of the outer peripheral surface S of the upper segment 11 in longitudinal section. FIG. 6 is a model view including the distal end portion SA of the outer peripheral surface S. However, the contour curve illustrated in the model view corresponds to a contour curve which is obtained by setting a magnification of a certain unit length of the cylinder 1 in the axial direction (Y direction in FIG. 6) and a magnification of a certain unit length of the cylinder 1 in the radial direction (X direction in FIG. 6) to 200 times and 2,000 times, respectively.

As illustrated in FIG. 6, in the contour curve which is obtained by measuring the outer peripheral surface S of the upper segment 11, within the range of being traced, the outer peripheral surface S of the upper segment 11 in this embodiment has a substantially convex shape, in which two symmetrical regions R1 are present with respect to the axial direction of the cylinder 1, and an asymmetrical region R2 including the distal end portion SA is formed between the two symmetrical regions R1. The contour curve is referred to as a sectional curve in surface roughness measurement.

In this embodiment, the outer peripheral surface S of the upper segment 11 has the symmetrical region R1, the asymmetrical region R2, and the symmetrical region R1 in the stated order from the engine combustion chamber side along the axial direction (Y direction) of the cylinder 1.

Further, the asymmetrical region R2 is located between the two symmetrical regions R1. A contour curve of the asymmetrical region R2 has an asymmetrical shape with respect to a center axis of line symmetry of a contour curve, the center axis being determined from the two symmetrical regions R1. The center axis of line symmetry is referred to as a first intermediate line W1.

In FIG. 6, a center deviation amount is determined. Specifically, a straight line which passes through the outer periphery vertex SP and extends along the radial direction (X direction in FIG. 6) of the segment is referred to as a line W2, and a line which passes through the outer periphery vertex SP and is orthogonal to the line W2 (that is, extends along the axial direction (Y direction) of the cylinder 1) is referred to as a line W3. A first center deviation amount P1 which is a distance between the first intermediate line W1 and the line W2 (line segment length in a W3 direction) given in this case is determined. The outer periphery vertex SP is a part on the most radially outer side in the radial direction (X direction) of the segment.

Further, in FIG. 6, a second intermediate line V1 is provided in addition to the first intermediate line W1 and the line W2. The second intermediate line V1 is defined as follows. In the asymmetrical region R2, among positions of the outer peripheral surface which intersects a line W4 orthogonal to the first intermediate line W1, the positions being apart from outer peripheral vertex SP by a distance of 4.0 micro meter toward radial inner direction (X direction), a position on the engine combustion chamber side is referred to as a first position a1, and a position on the side away from the engine combustion chamber is referred to as a second position b1. A length of a line segment between the first position a1 and the second position b1 is referred to as a length L, and an intermediate line of the line segment having the length L is referred to as the second intermediate line V1. In this occasion, a second center deviation amount P2 being a distance between the second intermediate line V1 and the line W2 (length of the line segment in the W3 direction) is determined.

As illustrated in FIG. 6, the second intermediate line V1 is positioned on a side away from the engine combustion chamber with respect to the first intermediate line W1. Further, the outer periphery vertex SP may be positioned on a side away from the engine combustion chamber side with respect to the second intermediate line V1 by a second center deviation amount P2, or may be positioned on the second intermediate line V1.

It is preferred that the first center deviation amount P1 of the upper segment 11 be set on the side away from the engine combustion chamber within the range of equal to or more than 0.02 mm and equal to or less than 0.10 mm (0.02 mm≤P1≤0.10 mm).

An indicator for indicating a direction of the engine combustion chamber side is applied to the upper segment 11 having a predetermined asymmetrical shape. Then, the outer periphery vertex SP of the upper segment 11 is attached to the oil ring groove 4 so as to be positioned on the side away from the engine combustion chamber.

<2-2. Shape of Outer Peripheral Surface S of Lower Segment 12>

Figure 8:
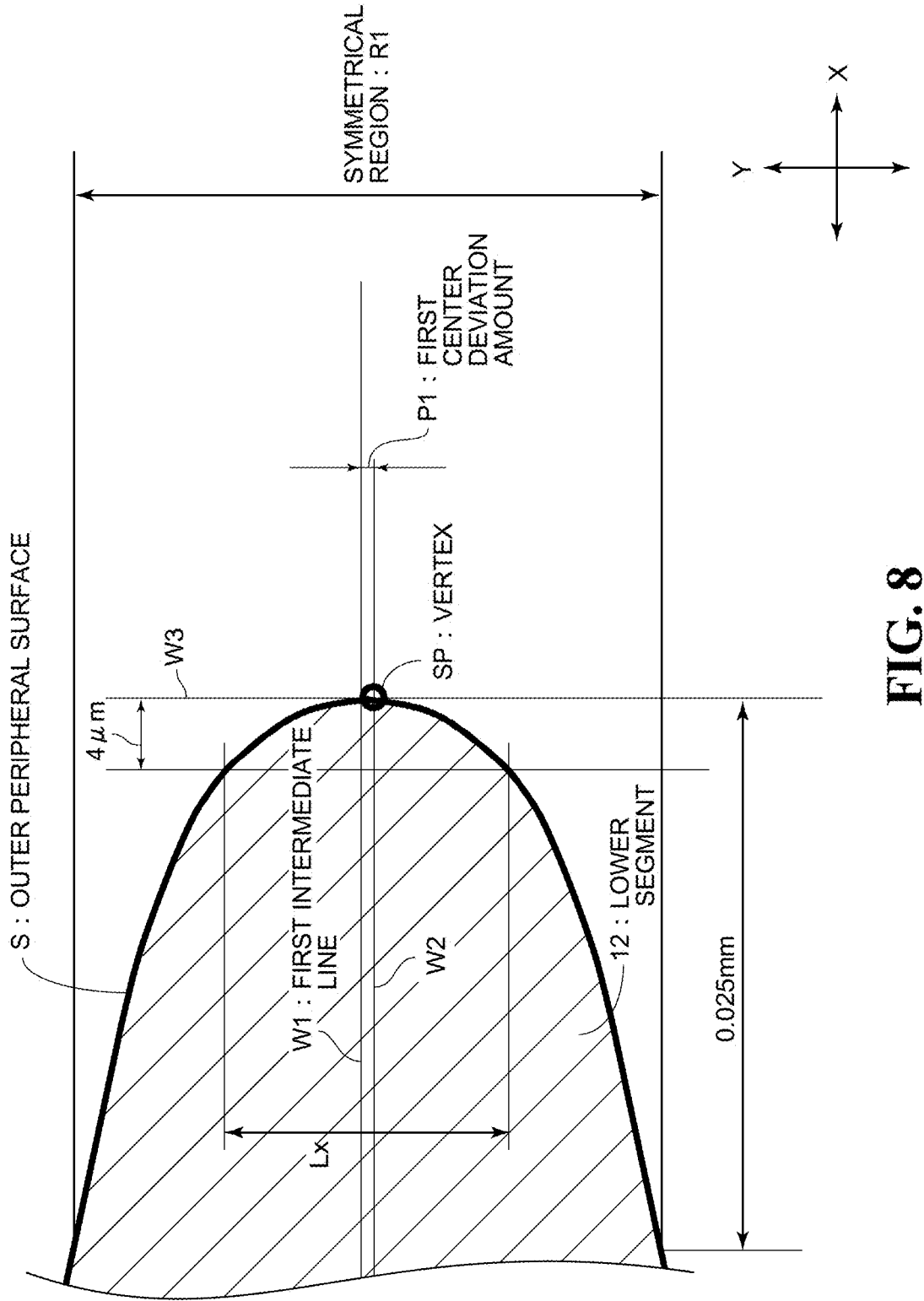
FIG. 8 is an illustration of a partial contour curve representing a shape of an outer peripheral surface of the lower segment 12 to be arranged on the side away from the engine combustion chamber side.

Next, the symmetrical shape of the outer peripheral surface S of the lower segment 12 is described. FIG. 8 is an illustration of a partial contour curve representing a shape of the outer peripheral surface S of the lower segment 12 in longitudinal section. FIG. 8 is a model view including the distal end portion SA of the outer peripheral surface S. However, the contour curve illustrated in the model view corresponds to a contour curve which is obtained by setting a magnification of a certain unit length of the cylinder 1 in the axial direction (Y direction in FIG. 8) and a magnification of a certain unit length of the cylinder 1 in the radial direction (X direction in FIG. 8) to 200 times and 2,000 times, respectively.

As illustrated in FIG. 8, in the contour curve which is obtained by measuring the outer peripheral surface S of the lower segment 12 within the traced range, the outer peripheral surface S of the lower segment 12 in this embodiment has an arc shape, and the traced contour curve is symmetrical in the axial direction of the cylinder 1. The center axis of line of the contour curve symmetry, the center axis being determined from the symmetrical region, is referred to as a first intermediate line W1.

In FIG. 8, with the first intermediate line W1 of the contour curve, a center deviation amount is determined. Specifically, a straight line which passes through the outer periphery vertex SP and extends along the radial direction (X direction in FIG. 8) of the segment is referred to as a line W2, and a line which passes through the outer periphery vertex SP and is orthogonal to the line W2 (that is, extends along the axial direction (Y direction) of the cylinder 1) is referred to as a line W3. A first center deviation amount P1 which is a distance between the first intermediate line W1 and the line W2 (line segment length in a W3 direction) given in this case is determined. The outer periphery vertex SP is a part on the most radially outer side in the axial direction (X direction) of the segment.

With regard to the first center deviation amount P1 of the lower segment 12, when it is defined that the center deviation amount given in a case in which the outer periphery vertex of the lower segment 12 in FIG. 8 is located on the engine combustion chamber side from the first intermediate line W1 is minus, and that the center deviation amount given in a case in which the outer periphery vertex is located on the side away from the engine combustion chamber from the first intermediate line W1 is plus, it is preferred that the first center deviation amount P1 of the lower segment 12 be more than −0.02 mm and less than 0.02 mm (−0.02 mm<P1<0.02 mm). For example, the first center deviation amount P1 of −0.02 mm corresponds to a case in which the outer periphery vertex SP of the lower segment 12 in FIG. 8 is at a position of 0.02 mm on the engine combustion chamber side from the first intermediate line W1.

<3. Shape of Distal End Portion SA of Outer Peripheral Surface S of Upper Segment 11>

Next, a shape of a distal end portion SA of the outer peripheral surface S of the upper segment 11 is described.

Figure 7:
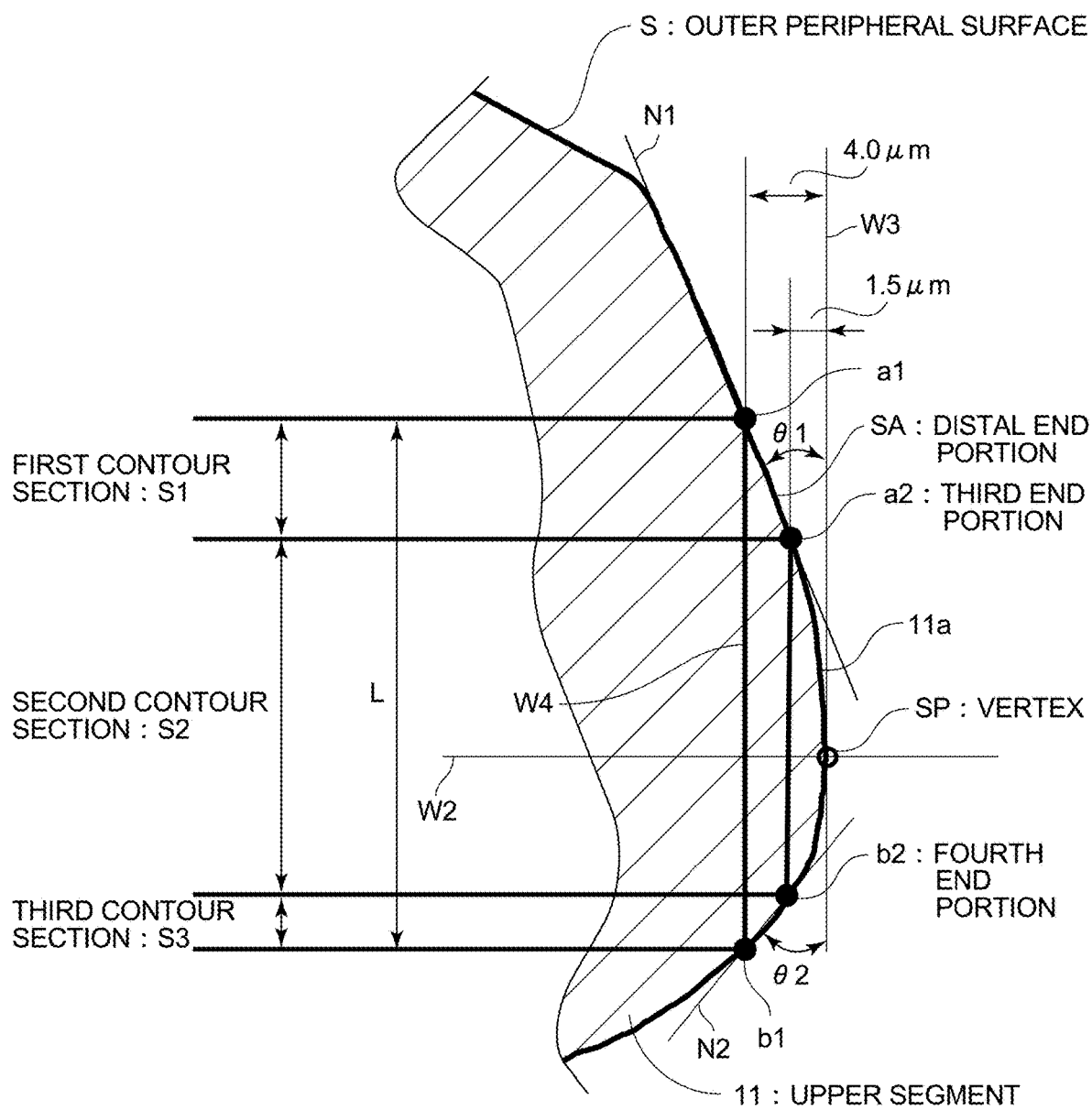
FIG. 7 is an enlarged illustration of a partial contour curve representing a distal end portion of the outer peripheral surface of the upper segment 11 illustrated in FIG. 6.

FIG. 7 is an illustration of a partial contour curve representing the distal end portion SA of the outer peripheral surface S of the upper segment 11 in an enlarged state. FIG. 7 is a model view of the distal end portion SA of the outer peripheral surface S. However, the contour curve illustrated in the model view corresponds to a contour curve which is obtained by setting a magnification of a certain unit length of the cylinder 1 in the axial direction (Y direction in FIG. 7) and a magnification of a certain unit length of the cylinder 1 in the radial direction (X direction in FIG. 7) to 1,000 times and 2,000 times, respectively. FIG. 7 is an illustration which is obtained by setting the shape of the outer peripheral surface S of the upper segment 11 to have a measurement magnification in the Y direction of 5 times of FIG. 6.

The distal end portion SA of the outer peripheral surface S of the upper segment 11 in this embodiment corresponds to a contour curve which extends from the vertex SP of the upper segment 11 toward the inner peripheral side in the radial direction (X direction) by a distance of 4.0 μm. The distal end portion SA of the outer peripheral surface S of the upper segment 11 is formed so as to extend over the outer periphery vertex SP and have a convex shape and being asymmetrical in the axial direction (Y direction) of the cylinder 1 at the distal end portion SA. Specifically, first, the contour curve in cross section at the distal end portion SA of the continuous outer peripheral surface S, which exist from the outer periphery vertex SP of the distal end portion SA to the part up to the distance of 4.0 μm toward the inner peripheral side in the radial direction (X direction), is divided into three sections including a first contour section S1, a second contour section S2, and a third contour section S3, which are arranged in the stated order from the engine combustion chamber side.

<4. First Contour Section S1, Second Contour Section S2, and Third Contour Section S3 of Upper Segment 11>

As illustrated in FIG. 7, the first contour section S1 is a contour portion which is formed so as to extend toward the engine combustion chamber side from an end portion of the engine combustion chamber side of the second contour section S2 as a starting point. The first contour section S1 has a curved shape similar to a quadratic curve shape, and may have a linear shape.

Further, the outer periphery vertex SP is present at a halfway portion of the second contour section S2. An end portion of the second contour section S2 on the engine combustion chamber side continues to the first contour section S1. An end portion of the second contour section S2 on the side away from the engine combustion chamber continues to the third contour section S3. The second contour section S2 has an arc shape. The arc shape includes a curved shape approximated to a quadratic curve. Further, the third contour section S3 is present on the side away from the engine combustion chamber with respect to the outer periphery vertex SP. The third contour section S3 is formed so as to be a part of a quadratic curve having a starting point at an end portion of the second contour section S2 on the side away from the engine combustion chamber.

A surface roughness in each of the first contour section S1, the second contour section S2, and the third contour section S3 is measured with a measurement direction set to the axial direction, and is equal to or less than 0.1 μmRa. The Ra is a kind of parameters of roughness, and is an arithmetic average roughness defined in ISO4287:1997 (JIS B0601: 2001).

The predetermined shapes of the first contour section S1 of the outer peripheral surface S, the asymmetrical region formed on the engine combustion chamber side from the first contour section S1, and the second contour section S2 may be formed by machining or in a shape approximated to a segment line material being a base material of the upper segment 11. The third contour section S3 is formed so as to have a shape approximated to the base material for the upper segment 11, and is finished by polishing capable of maintaining the shape of the base material.

Further, in the contour curve which is formed of the first contour section S1, the second contour section S2, and the third contour section S3 of the outer periphery distal end portion in upper segment longitudinal section, two positions on the contour curve at a position away by a distance of 4.0 μm from the outer periphery vertex toward the inner peripheral side in the segment radial direction are defined as a first position and a second position, which are denoted by reference symbols a1 and b1, respectively. Two positions on the contour curve at a position away by a distance of 1.5 μm from the outer periphery vertex toward the inner peripheral side in the segment radial direction are defined as a third position and a fourth position, which are denoted by reference symbols a2 and b2, respectively.

Further, a straight line which passes through the first position a1 and the third position a2 is referred to as a straight line N1. An angle (upper angle) formed between the straight line N1 and the line W3 which passes through the outer periphery vertex SP and extends along the axial direction (Y direction) of the cylinder 1 (that is, orthogonal to the radial direction (X direction)) is assumed to be θ1 degrees. Further, a straight line which passes through the second position b1 and the fourth position b2 is referred to as a straight line N2. An angle (lower angle) formed between the straight line N2 and the line W3 is assumed to be θ2 degrees.

Values of the angle θ1 (upper angle) and the angle θ2 (lower angle) of the upper segment 11 are shown in Table 1 with actual measurement values obtained through oil consumption measurement and friction measurement.

The actual measurement values are each an average value of values at three points including a 90-degree position from the abutment, a 180-degree position from the abutment, and a 270-degree position from the abutment, the abutment being illustrated in FIG. 2.

Figure 10:
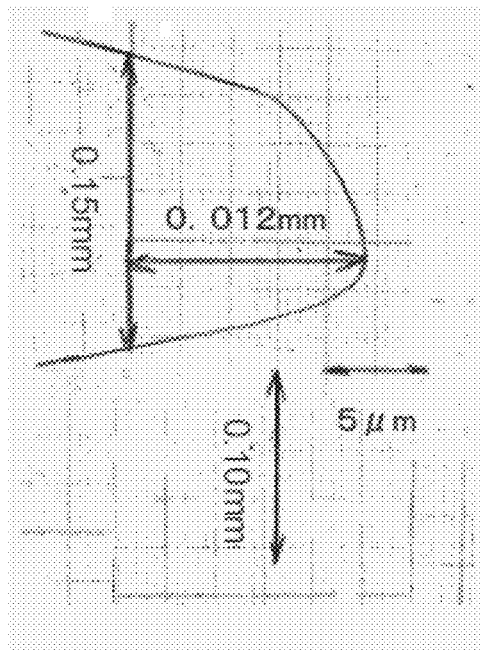
FIG. 10 is an illustration of a contour curve which is given when the outer peripheral surface of the upper segment 11 illustrated in FIG. 6 is measured.
Figure 11:
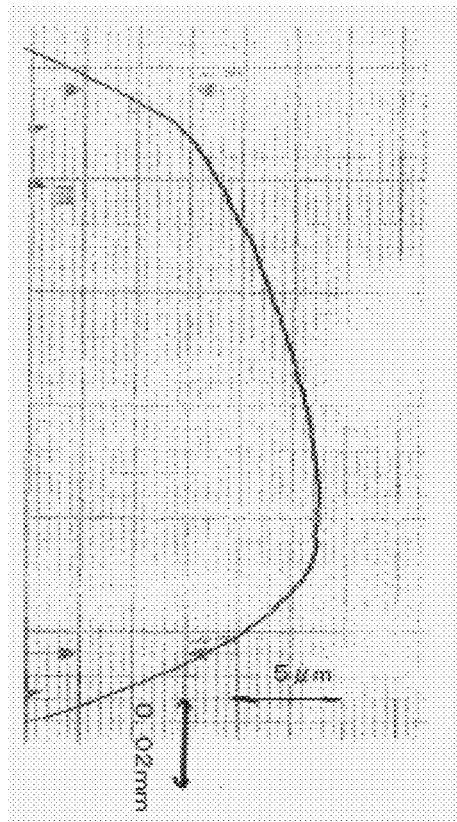
FIG. 11 is an enlarged illustration of a contour curve representing a distal end portion of the outer peripheral surface of the upper segment 11 illustrated in FIG. 10.

FIG. 10 and FIG. 11 are illustrations of the contour curve of the outer peripheral surface S which is given when the upper segment 11 illustrated in FIG. 7 is actually measured (Example). FIG. 10 is an illustration of the contour curve which is given when the outer peripheral surface S is actually measured. FIG. 11 is a contour curve which is an enlargement of the distal end portion SA of the outer peripheral surface S measured in FIG. 10. A measurement magnification in FIG. 10 is 2,000 times in the radial direction (X direction) and 200 times in the axial direction (Y direction) of the cylinder 1. Further, a measurement magnification in FIG. 11 is 2,000 times in the radial direction (X direction) and 1,000 times in the axial direction (Y direction) of the cylinder 1. In the measurement of the contour curve, the measurement was performed in accordance with ISO 4287:1997 (JIS B0601:2001) (this similarly applies to the measurement of other contour curves).

<5. Shape of Distal End Portion SA of Outer Peripheral Surface S of Lower Segment 12>

Next, a shape of a distal end portion SA of the outer peripheral surface S of the lower segment 12 is described.

Figure 9:
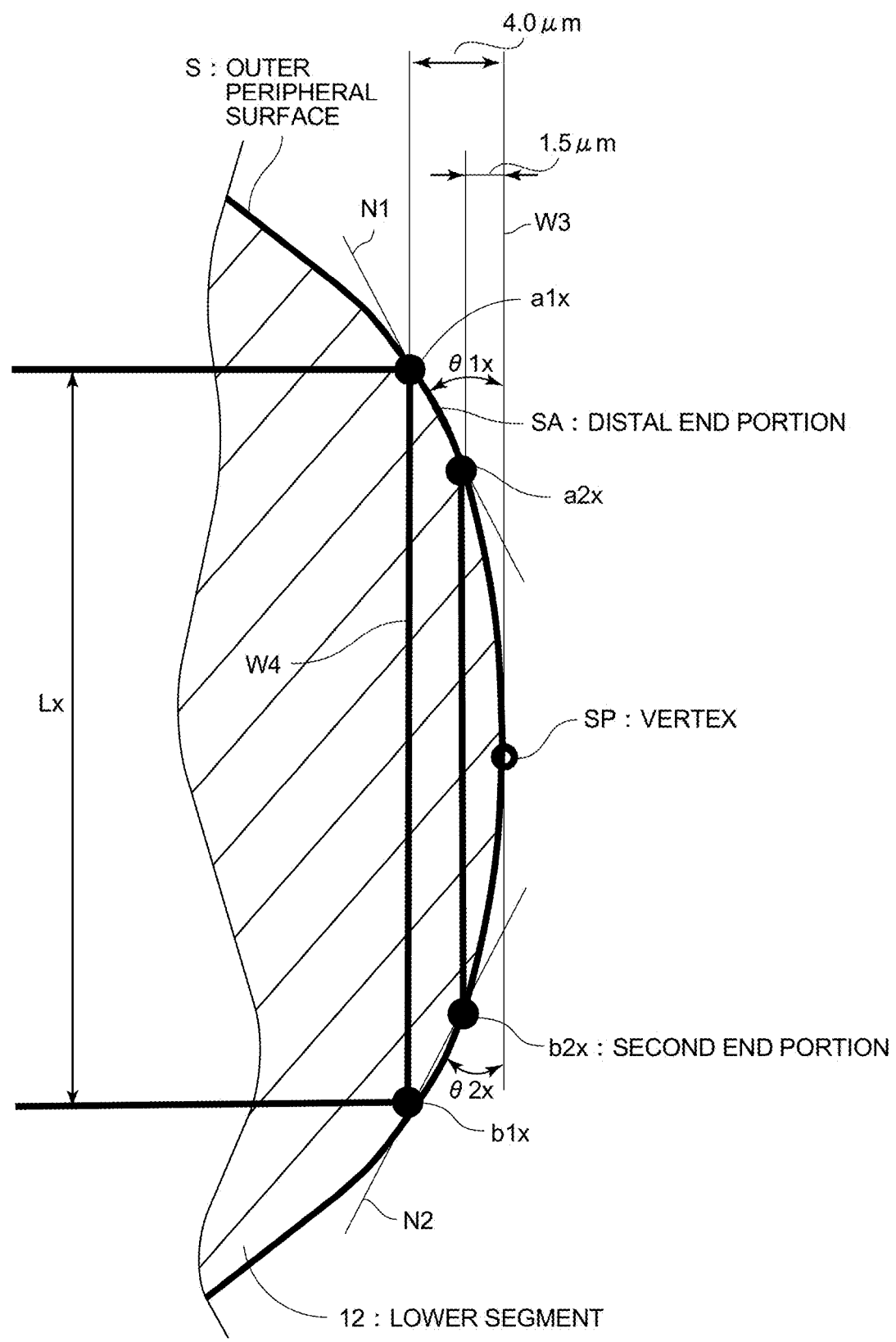
FIG. 9 is an enlarged illustration of a partial contour curve representing a distal end portion of the outer peripheral surface of the lower segment 12 illustrated in FIG. 8.

FIG. 9 is an illustration of a partial contour curve representing the distal end portion SA of the outer peripheral surface S of the lower segment 12 in an enlarged state. FIG. 9 is a model view of the distal end portion SA of the outer peripheral surface S. However, the contour curve illustrated in the model view corresponds to a contour curve which is obtained by setting a magnification of a certain unit length of the cylinder 1 in the axial direction (Y direction in FIG. 9) and a magnification of a certain unit length of the cylinder 1 in the radial direction (X direction in FIG. 9) to 1,000 times and 2,000 times, respectively. FIG. 9 is an illustration which is obtained by setting the shape of the outer peripheral surface S of the lower segment 12 to have ameasurement magnification in the Y direction of 5 times of FIG. 8.

The distal end portion SA of the outer peripheral surface S of the lower segment 12 in this embodiment corresponds to a contour curve which extends from the vertex SP of the lower segment 12 toward the inner peripheral side in the radial direction (X direction) by a distance of 4.0 μm. The distal end portion SA of the outer peripheral surface S of the lower segment 12 is formed so as to extend over the vertex SP and have an arc shape and being symmetrical in the axial direction (Y direction) of the cylinder 1 at the distal end portion SA.

A surface roughness in the symmetrical portions of the outer peripheral surface of the lower segment 12, which extend toward the inner peripheral side in the segment radial direction from the outer periphery vertex at least by a distance of 10 μm, is measured with a measurement direction set to the axial direction, and is equal to or less than 0.1 μmRa. The Ra is a kind of parameters of roughness, and is an arithmetic average roughness defined in ISO4287:1997 (JIS B0601:2001).

The distal end portion SA of the outer peripheral surface S is formed so as to have a shape approximated to the segment line material being the base material for the lower segment 12, and is finished by polishing capable of maintaining the shape of the base material.

Further, in the distal end portion SA at the outer periphery of the lower segment longitudinal section, two positions on the contour curve at a position away by a distance of 4.0 μm from the outer periphery vertex toward the inner peripheral side in the segment radial direction are defined as a fifth position and a sixth position, which are denoted by reference symbols a1x and b1x, respectively. Two positions on the contour curve at a position away by a distance of 1.5 μm from the outer periphery vertex toward the inner peripheral side in the segment radial direction are defined as a seventh position and an eighth position, which are denoted by reference symbols a2x and b2x, respectively.

Further, a straight line which passes through the fifth position a1x and the seventh position a2x is referred to as a straight line N1. An angle (upper angle) formed between the straight line N1 and the line W3 which passes through the vertex SP and extends along the axial direction (Y direction) of the cylinder 1 (that is, orthogonal to the radial direction (X direction)) is assumed to be θ1x degrees. Further, a straight line which passes through the sixth position b1x and the eighth position b2x is referred to as a straight line N2. An angle (lower angle) formed between the straight line N2 and the line W3 is assumed to be θ2x degrees.

Values of the angle θ1x (upper angle) and the angle θ2x (lower angle) of the lower segment 12 are shown in Table 2 with actual measurement values obtained through oil consumption measurement and friction measurement. The actual measurement values are each an average value of values at three points including a 90-degree position from the abutment, a 180-degree position from the abutment, and a 270-degree position from the abutment, the abutment being illustrated in FIG. 2.

Figure 12:
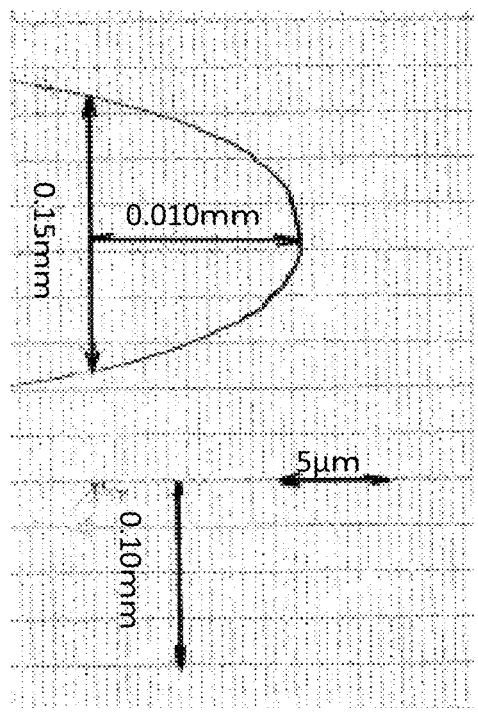
FIG. 12 is an illustration of a contour curve which is given when the outer peripheral surface of the lower segment 12 illustrated in FIG. 8 is measured.
Figure 13:
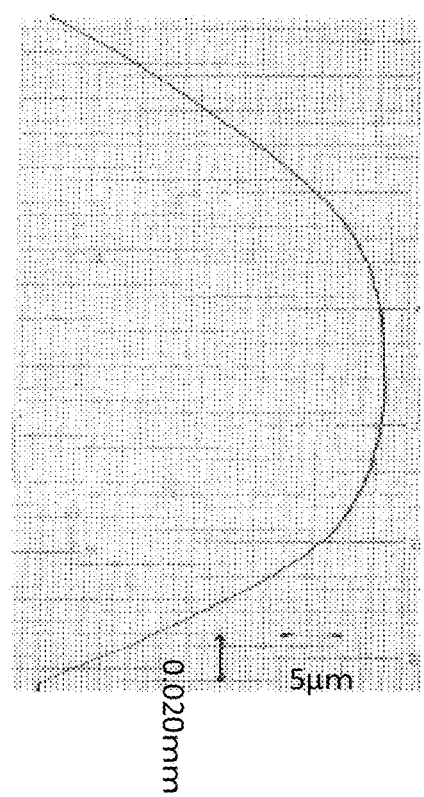
FIG. 13 is an enlarged illustration of a contour curve representing a distal end portion of the outer peripheral surface of the lower segment 12 illustrated in FIG. 12.

FIG. 12 and FIG. 13 are illustrations of the contour curve of the outer peripheral surface S which is given when the lower segment 12 illustrated in FIG. 9 is actually measured (Example). FIG. 12 is a contour curve which is given when the outer peripheral surface S is measured. FIG. 13 is a contour curve which is an enlargement of the distal end portion SA of the outer peripheral surface S measured in FIG. 12. A measurement magnification in FIG. 12 is 2,000 times in the radial direction (X direction) and 200 times in the axial direction (Y direction) of the cylinder 1. Further, a measurement magnification in FIG. 13 is 2,000 times in the radial direction (X direction) and 1,000 times in the axial direction (Y direction) of the cylinder 1. In the measurement of the contour curve, the measurement was performed in accordance with ISO 4287:1997 (JIS B0601:2001) (this similarly applies to the measurement of other contour curves).

<6. Method of Forming Shape of Outer Peripheral Surface S of Upper Segment 11>

Next, a method of forming the outer peripheral surface S of the upper segment 11 is described. A linear steel wire rod for segment having a sectional shape equivalent to final-product sectional-shape is formed into an annular shape, and an outer peripheral surface of the annular wire rod for segment is subjected to surface treatment. After that, for example, with use of a belt grinding apparatus, the annular steal wire rod is sandwiched by a rotating belt in the width direction of the segment and is fixed by an elastic member provided on a side opposite to the segment, a rotating belt having grinding grains is pressed against the outer peripheral surface S, the outer peripheral surface S is formed into a predetermined asymmetrical shape. The asymmetrical shape may be formed in a state of the linear wire rod for segment being a base material for the upper segment 11 or may be formed after the linear wire rod for segment is formed into an annular shape, and any method may be employed.

<7. Method of Forming Shape of Outer Peripheral Surface S of Lower Segment 12>

Next, a method of forming the outer peripheral surface S of the lower segment 12 is described. A linear steel wire rod for segment having a sectional shape equivalent to final-product sectional-shape is formed into an annular shape, and an outer peripheral surface of the annular wire dor for segment is subjected to surface treatment. After that, for example, with use of a buff grinding apparatus, the outer peripheral surface S of the segment is formed into the symmetrical shape with a predetermined grinding condition.

<8. Method of Forming Hard Coatings 11a and 12a on Outer Peripheral Surfaces S of Upper Segment 11 and Lower Segment 12>

Next, a method of forming hard coatings 11a and 12a on the surfaces of outer peripheral surfaces S of the segments 11 and 12 is described. Typically, the same hard coating is applied to each of the pair of segments. However, different hard coatings may be applied to the segments, and it is preferable to apply a coating superior in abrasion resistance to the upper segment 11 as compared with the lower segment 12. The coating may have a layer structure.

The hard coating 11a and 12a which are formed by the following method are selected.

(8-1) Method of Forming Chromium Nitride Coating (PVD Coating)

First, a method of forming chromium nitride coatings being the hard coatings 11a and 12a to the outer peripheral surfaces S of the segments 11 and 12 is described. As the coating forming method, there has been known a method of forming a coating with use of an arc ion plating apparatus for performing an arc ion plating method being a kind of a physical vapor deposition (PVD) method. When a nitride coating is to be formed by the arc ion plating method, a metal target of Cr is used, and the base materials for the segments 11 and 12 are set in the arc ion plating apparatus. After that, under a state in which the outer peripheral surfaces S of the base materials for the segments 11 and 12 are rotated to form a coating on an entire periphery of the outer peripheral surfaces S of the base material in the circumferential direction, an inside of the arc ion plating apparatus is reduced in pressure by evacuation, and the base materials are heated.

After that, a bias voltage is applied to the base material to perform ion bombardment using the metal target. The bias voltage to be applied may be set, for example, within the range of from −500 V to −1,000 V. Next, another bias voltage is applied to introduce process gas into the arc ion plating apparatus, to thereby form the hard coatings 11a and 12a each having a predetermined thickness on the outer peripheral sliding surfaces of the segments 11 and 12. As another bias voltage, the bias voltage may be set, for example, within the range of from 0 V to −200 V. As the process gas, $N_2$ gas may solely be used, or other $O_2$ gas or $CH_4$ may be added.

It is preferred that that a surface hardness of the coating be set to 800 HV or more, more preferably to 1,000 HV or more. It is preferred that a thickness of the coating be set to 10 μm or more. Through setting of the thickness of the chromium nitride coating (PVD film) to 10 μm or more, the abrasion resistance can easily be secured.

(8-2) Method of Forming Amorphous Carbon Coating (DLC Coating)

Next, a method of forming amorphous carbon coatings (diamond-like carbon (DLC) coatings) being the hard coatings 11a and 12a on the outer peripheral surfaces S of the segments 11 and 12 is described. As a method of forming a DLC coating, there has been known a method of using an arc ion plating apparatus for performing the arc ion plating method. The base materials for the segments 11 and 12 are set in the arc ion plating apparatus. After that, under a state in which the outer peripheral surfaces S of the base materials for the segments 11 and 12 are rotated to form a coating on an entire periphery in the circumferential direction, an inside of the arc ion plating apparatus is reduced in pressure by evacuation, and the base materials are heated. After that, a bias voltage is applied to the segment base materials to perform ion bombardment using argon ion. The bias voltage to be applied may be set, for example, within the range of from −50 V to −300 V.

Next, after a predetermined bias voltage is applied, a Ti coating serving as an adhesive layer is formed. The predetermined bias voltage may be set, for example, within the range of from −50 V to −300 V. Next, a DLC coating (a-C layer) having an amorphous carbon structure is formed on the Ti coating by sputtering with use of argon. At this time, the bias voltage is set, for example, within the range of from −50 V to −300 V. Further, a DLC coating (ta-C layer) having a tetrahedral carbon structure is formed on the a-C layer by filtered arc ion plating. At this time, the bias voltage is set, for example, within the range of from −100 V to −300V. Those two layers are alternately and repeatedly layered to form the hard coatings 11a and 12a each having a predetermined thickness on the outer peripheral sliding surfaces of the segment base material. At this time, the a-C layer may be omitted.

It is preferred that the surface hardness of the coating be 1,500 HV or more and that the thickness of the coating be 3 μm or more. Through setting of the thickness of the amorphous carbon coating to 3 μm or more, the abrasion resistance can be easily secured.

(8-3) Complex Layer Structure Coating

For the purpose of improving abrasion resistance and low-friction characteristic of the segments, the DLC coatings of the section (8-2) having a thin coating thickness may cover an upper side (segment outer peripheral side) of the chromium nitride coating (PVD coating) surfaces, to thereby form the hard coatings 11a and 12a as complex layer structure coatings.

The thickness of the coating of the chromium nitride coating (PVD coating) may suitably be set to 5 μm or more, and the thickness of the coating of the DLC coating may suitably be set to 0.5 μm or more. Further, the adhesive layer between the chromium nitride coating and the DLC coating may be omitted.

<9. Method of Oil Consumption Measurement Test>

Next, the oil consumption measurement test which is performed with use of the combination oil ring 10 according to this embodiment is described. In the oil consumption measurement test, an engine having a 2-liter class displacement volume and an 80-millimeter class bore diameter was used. After a running-in operation of the engine, in a load condition of wide-open throttle (WOT; full load), a cooling water temperature was set to 100° C., and a temperature of the engine oil was set to 125° C. As the engine oil, GF-50W-20 (grade: ILSAC standard, viscosity class: SAE J300) was used.

With the average piston velocity of the engine being defined as V, the oil consumption (lubrication oil consumption (LOC)) was evaluated with a condition of a high-speed region in which V is 20.2 m/s. The average piston velocity is an average velocity of the piston 2 which is determined based on a rotation velocity and a stroke of the engine. In the oil consumption measurement, the oil consumption was measured by a fixed oil level method using an oil consumption meter.

Of the piston ring used in the test, a top ring has a width (dimension in the axial direction of the cylinder 1) of 1.2 mm, an outer peripheral surface having a barrel shape, and a DLC coating which is applied to the outer peripheral surface by the arc ion plating method and contains only carbon. The surface roughness was 0.03 μmRa. A bore diameter ratio of a top ring tension was 0.07 (N/mm). Further, a second ring has a width (dimension in the axial direction of the cylinder 1) of 1.2 mm, an outer peripheral surface having a tapered shape, and has the outer peripheral surface to which hard Cr plating is applied. The surface roughness was 0.03 μmRa. A bore diameter ratio of a second ring tension was 0.07 (N/mm). The combination oil ring 10 has a combination width h0 of 2.0 mm, a segment width h1 of 0.4 mm for each of the segments 11 and 12, and a DLC coating which is applied to the outer peripheral surface by the arc ion plating method and contains only carbon. The surface roughness of the outer peripheral surface was 0.03 μmRa. An oil ring tension Ft was set to 0.25 (N/mm) in bore diameter ratio.

In this test, a side clearance SC between the combination oil ring 10 and the oil ring groove 4 of the piston 2 was set to 0.11 mm.

A material equivalent to JIS SUS440B was used for the base material of the segments 11 and 12, and a DLC coating (which has a coating thickness of 5 μm and a surface hardness of 1,600 HV in Vickers Hardness) was applied to the outer peripheral surfaces of the segments 11 and 12.

With regard to the measurement of the Vickers hardness described above, after a measurement sample was mirror-polished, measurement was conducted in accordance with "Vickers hardness test—Test method" of JIS Z 2244 with a micro Vickers hardness meter under the conditions including a test force of 0.9807 N and a time period of 15 seconds for maintaining the test force (this similarly applies to other Vickers hardness).

With regard to the shapes of the outer peripheral surfaces S of the segments 11 and 12, under a state in which the segments 11 and 12 each have a magnification in the radial direction (X direction) and a magnification in the axial direction (Y direction) of the cylinder 1 set to 2,000 times and 200 times, respectively, a contour curve which extends from the outer peripheral vertex SP of the outer peripheral surface S toward the radially inner side in the radial direction (X direction) by a distance of 0.025 mm was measured. Further, measurement positions were set to three positions including 90 degrees, 180 degrees, and 270 degrees from the abutment of each of the segments. 11 and 12 in the circumferential direction, and the measurement values shown in Table 1 correspond to average values of the three positions.

Further, for the measurement of the outer peripheral shapes of the outer peripheral surfaces S of the segments 11 and 12, a contact-needle type surface roughness measurement instrument manufactured by Kosaka Laboratory Ltd. (Surfcorder SE-30C) was used, and PU-DJ2S (distal end spherical surface diameter of 2 μm and a cone taper angle of 60 degrees) was used as a detector. Further, a feed speed in a lateral magnification was set to 0.1 mm/s when the magnification in the axial direction (Y direction) of the cylinder 1 was set to 200 times. The feed speed in the lateral magnification was set to 0.05 mm/s when the magnification in the axial direction (Y direction) of the cylinder 1 was set to 1000 times. However, the speed may be lower than the above-mentioned speeds.

Under the conditions described above, dimensions of the outer peripheral shape of the segment subjected to the oil consumption measurement test and the friction measurement test with use of the motoring tester described later are shown in Table 1 and Table 2.

In Table 1, there are shown an upper angle θ1, a lower angle θ2, a length L of a line segment between the first position a1 and the second position b1, a first center deviation amount P1, and a second center deviation amount P2 of the shape of the outer peripheral surface S of the upper segment 11.

In Table 2, there are shown an angle θ1x being an upper angle, an angle θ2x being a lower angle, a length Lx of a line segment between the fifth position a1x and the sixth position b1x, and a first center deviation amount P1 of the shape of the outer peripheral surface S of the lower segment 12. The first center deviation amount P1 is indicated as being minus when the outer periphery vertex of the segment is positioned on the engine combustion chamber side with respect to the first intermediate line. Further, a difference between the upper angle θ1x and the lower angle θ2x, which indicates the symmetry of the shape of the outer peripheral surface S of the lower segment 12, is represented by an absolute value |θ1x−θ2x|. For reference, a drop (distance (μm) in the radial direction) from the outer periphery vertex in the measurement width in the slide direction by the evaluation method of the related art is shown in the remarks column.

The outer peripheral shapes of the segments 11 and 12 subjected to the measurement in Table 3 are as follows.

In Examples 1 to 7 and Comparative Examples 1 to 5, the upper segment 11 in which the outer periphery distal end portion of the outer peripheral surface S has an asymmetrical shape as illustrated in FIG. 6 (any one of signs US1 to SU6 in Table 1) was used, and the lower segment 12 in which the outer periphery distal end portion of the outer peripheral surface S has a symmetrical convex shape as illustrated in FIG. 8 (any one of signs LS1 to LS7) was used.

In Reference Example 1, the sign US2 in Table 1 and the sign US1 in Table 1 in which the outer periphery distal end portion has an asymmetrical shape as illustrated in FIG. 6 were used for the upper segment 11 and the lower segment 12.

In Reference Example 2, the sign LS7 in Table 2 in which the outer periphery distal end portion has a symmetrical shape as illustrated in FIG. 8 was used for the upper segment 11 and the lower segment 12.

In Reference Example 3, the sign US6 in Table 1 in which the outer periphery distal end portion has an asymmetrical shape as illustrated in FIG. 6 was used for the upper segment 11 and the lower segment 12.

In Reference Example 4, the sign US4 in Table 1 in which the outer periphery distal end portion has an asymmetrical shape as illustrated in FIG. 6 was used for the upper segment 11 and the lower segment 12.

In Reference Example 5, the sign LS4 in Table 2 in which the outer periphery distal end portion has a symmetrical shape as illustrated in FIG. 8 was used for the upper segment 11 and the lower segment 12.

<10. Results of Oil Consumption Measurement Test>

Results of oil consumption measurement are shown in Table 3. The oil consumption ratio in Table 3 is shown such that other oil consumption is shown in ratio with the oil consumption of Comparative Example 1 being 100 with the average piston velocity V of V=20.2 m/s.

Evaluation criteria for the results of the oil consumption measurement is as follows.

A: oil consumption ratio less than 85
B: oil consumption ratio equal to or more than 85 and less than 100
C: oil consumption ratio equal to or more than 100

TABLE 1

| Sign | Upper Angle θ1 [Degrees] | Lower Angle θ2 [Degrees] | L [mm] | P1: First Center Deviation Amount [mm] | P2: Second Center Deviation Amount [mm] |
|---|---|---|---|---|---|
| US1 | 2.0 | 9.0 | 0.180 | 0.080 | 0.040 |
| US2 | 3.0 | 8.0 | 0.180 | 0.090 | 0.050 |
| US3 | 3.0 | 9.0 | 0.180 | 0.100 | 0.060 |
| US4 | 6.0 | 13.0 | 0.115 | 0.065 | 0.030 |
| US5 | 9.0 | 19.0 | 0.050 | 0.020 | 0.000 |
| US6 | 10.0 | 9.0 | 0.045 | 0.025 | 0.010 |

TABLE 2

| Sign | Upper Angle θ1x [Degrees] | Lower Angle θ2x [Degrees] | |θ1x−θ2x| [Degrees] | Lx [mm] | P1: First Center Deviation Amount [mm] | Remark: Drop from Vertex SP of Outer Peripheral Surface S in Measurement Width (mm) [μm/Measurement Width (mm)] |
|---|---|---|---|---|---|---|
| LS1 | 2.0 | 2.0 | 0.0 | 0.240 | 0.000 | — |
| LS2 | 2.0 | 2.0 | 0.0 | 0.200 | — | — |
| LS3 | 3.0 | 3.0 | 0.0 | 0.180 | 0.000 | 2/0.15 |
| LS4 | 6.5 | 5.5 | 1.0 | 0.110 | 0.010 | 7/0.15 |
| LS5 | 7.5 | 9.0 | 1.5 | 0.090 | −0.015 | 14/0.15 |
| LS6 | 9.0 | 9.0 | 0.0 | 0.080 | 0.005 | 16/0.15 |
| LS7 | 11.0 | 9.0 | 2.0 | 0.070 | 0.020 | 20/0.15 |

TABLE 3

| | Segment Outer Peripheral Shape | | oil consumption ratio Average Piston Velocity V (m/s) | | |
|---|---|---|---|---|---|
| | Upper Segment | Lower Segment | 18.9 | 20.2 | Evaluation |
| Example 1 | US3 | LS2 | 58 | 82 | A |
| Example 2 | US3 | LS6 | 56 | 80 | A |

TABLE 3-continued

| | Segment Outer Peripheral Shape | | oil consumption ratio Average Piston Velocity V (m/s) | | |
|---|---|---|---|---|---|
| | Upper Segment | Lower Segment | 18.9 | 20.2 | Evaluation |
| Example 3 | US4 | LS3 | 55 | 78 | A |
| Example 4 | US4 | LS4 | 53 | 74 | A |
| Example 5 | US4 | LS5 | 56 | 77 | A |
| Example 6 | US5 | LS2 | 60 | 82 | A |
| Example 7 | US5 | LS6 | 58 | 80 | A |
| Comparative Example 1 | US1 | LS2 | 74 | 100 | C |
| Comparative Example 2 | US2 | LS2 | 58 | 90 | B |
| Comparative Example 3 | US3 | LS1 | 60 | 87 | B |
| Comparative Example 4 | US6 | LS6 | 60 | 86 | B |
| Comparative Example 5 | US5 | LS7 | 65 | 97 | B |
| Reference Example 1 | US2 | US1 | 60 | 87 | B |
| Reference Example 2 | LS7 | LS7 | 78 | 122 | C |
| Reference Example 3 | US6 | US6 | 62 | 90 | B |
| Reference Example 4 | US4 | US4 | 43 | 63 | A |
| Reference Example 5 | LS4 | LS4 | 60 | 85 | B |

Evaluation

According to the present invention, the oil consumption measurement test of from Reference Example 1 to Reference Example 5 was conducted, and the friction measurement test was further conducted, to thereby solve the problems and achieve the object.

When the average piston velocity V is V=20.2 m/s, Example 1 to Example 7 have an oil consumption ratio of from 74 to 82 with respect to Comparative Example 1, and are preferred levels. Meanwhile, Comparative Example 1 to Comparative Example 5 have an oil consumption ratio of equal to or more than 86, and are not preferred levels. In Table 3, from comparison of Example 4 (combination of US4 and LS4), Reference Example 4 (combination of US4 and US4), and Reference Example 5 (combination of LS4 and LS4), in terms of reduction of oil consumption, Reference Example 4 gives the most favorable result, in which both the upper segment 11 and the lower segment 12 have an asymmetrical shape at the segment outer periphery distal end portion and in which the outer periphery vertex is positioned on the side away from the engine combustion chamber. However, in the case of the combination in which both the upper segment 11 and the lower segment 12 have the asymmetrical shape at the segment outer periphery distal end portion, when the oil ring tension Ft is set to a low tension based on a level of equal to or more than 0.25, which is a value Ft/d obtained by dividing the oil tension Ft by the bore diameter d (unit: mm), there arises a problem of increase in friction.

Example 4 is a combination of the US4 being the upper segment 11 in which the segment outer peripheral shape of the distal end portion is set to the asymmetrical shape and the LS4 being the lower segment 12 in which the segment outer peripheral shape of the distal end portion is set to the symmetrical shape. Reference Example 5 is a combination of the LS4 being the upper segment 11 in which the segment outer peripheral shape of the distal end portion is set to the symmetrical shape and the LS4 being the lower segment 12 in which the segment outer peripheral shape of the distal end portion is set to the symmetrical shape. From the comparison above, it is preferred for reduction of oil consumption that the upper segment 11 in which the segment outer periphery distal end portion has the asymmetrical shape be employed. In Example 4, as compared to Reference Example 5, there can be seen reduction of 13% when the average piston velocity V=20.2 m/s is given.

Reference Example 4 is a combination of the US4 being the upper segment 11 in which the segment outer peripheral shape of the distal end portion is set to the asymmetrical shape and the US4 being the lower segment 12 in which the same segment outer peripheral shape of the distal end portion is set to the asymmetrical shape. Example 4 is a combination of the US4 being the upper segment 11 in which the segment outer peripheral shape of the distal end portion is set to the asymmetrical shape and the LS4 being the lower segment 12 in which the segment outer peripheral shape of the distal end portion is set to the symmetrical shape. From the comparison above, it is preferred for reduction of oil consumption that the upper segment 11 in which the segment outer periphery distal end portion has the asymmetrical shape be employed. In Reference Example 4, as compared to Example 4, there can be seen reduction of 15% when the average piston velocity V=20.2 m/s is given. In Reference Example 4, as compared to Reference Example 5, there can be seen reduction of 26%.

It has been considered that oil consumption of the engine oil is increased by self-elimination caused by combustion of engine oil which stagnate on the inner wall of the cylinder 1 at the time of engine combustion and by discharge of the engine oil in the engine exhaust stroke. In the high-speed region with high-speed rotation of the engine, in principle, the oil film thickness is increased, and the oil consumption is increased. However, reduction of oil consumption through employment of the segment in which the outer periphery distal end portion has an asymmetrical shape as illustrated in FIG. 6 is considered to have an effect of scraping down the engine oil and suppressing increase in oil film thickness. Further, it is also considered that increase in oil consumption due to an engine oil scraping-up action of the segment is also suppressed. When the oil film thickness is reduced in the oil ring lowering stroke, the amount of engine oil scraped up by the segment is also reduced in the raising stroke. It has also been reported that increase in oil consumption in the high-speed region with high-speed rotation of the engine is caused by increase in the amount of oil raised from the piston ring back surface to the engine combustion chamber. The passage of the engine oil through which the engine oil is raised to the engine combustion chamber involves a piston ring abutment gap other than those passages.

In Examples, in the shape of the outer peripheral surface S in which the outer periphery distal end portion of the upper segment 11 has an asymmetrical shape, the angle $\theta 1$ of the upper angle is equal to or more than 3 degrees and equal to or less than 9 degrees, the first center deviation amount P1 is from 0.02 mm to 0.10 mm, and the second center deviation amount P2 is equal to or more than 0 mm. In this case, it is considered, as one factor, that a gap between the outer periphery distal end portion of the upper segment 11 and the inner wall of the cylinder 1 is larger on the engine combustion chamber side, and the oil pressure rise of the engine oil due to the wedge film effect between two surfaces of the cylinder 1 and the upper segment 11 during the oil ring raising stroke is small, with the result that the engine oil is liable to flow out to a lower side of the upper segment. The engine oil which is scraped down by the segment or flows out to the lower side passes through the oil return hole 5 formed on the inner peripheral side of the oil ring groove 4, and is collected in an oil tank (not shown) for engine oil.

From Comparative Example 1, when the angle θ1 being the upper angle is less than 3 degrees, the oil pressure of the engine oil due to the wedge film effect between two surfaces of the cylinder 1 and the upper segment 11 rises at the time of rise of the oil ring, with the result that engine oil becomes less likely to flow in from the engine combustion chamber side of the outer peripheral surface S of the upper segment 11. It is considered that, with such an action, the engine oil stagnates in the gap formed between the inner wall of the cylinder 1 and the outer peripheral surface S of the upper segment 11 on the engine combustion chamber side, and the engine oil is conveyed to a upper end of the upper segment 11. Thus, reduction of oil consumption cannot be expected.

From Comparative Example 4, when the angle θ1 being the upper angle is equal to or more than 10 degrees, the length L from the outer periphery vertex to a position apart by a distance of 4.0 μm is less than 0.05 mm, and there can be given no sufficient contact length between the inner wall of the cylinder 1 and the outer periphery distal end portion of the upper segment 11 in the axial direction (Y direction) of the cylinder 1. Thus, it can be considered that the action of scraping down the engine oil, which forms the oil film on the inner wall surface of the cylinder 1, becomes poor during the oil ring lowering stroke, with the result that increase in oil consumption may occur.

From Comparative Example 2, it is considered that, when the angle θ2 being the lower angle is less than 9 degrees, the edge effect of scraping down the engine oil, which forms the oil film on the inner wall surface of the cylinder 1, becomes poor during the oil ring lowering stroke. It is considered that, when the angle θ2 being the lower angle is equal to or more than 9 degrees, the edge effect of scraping down the engine oil is effective.

In the outer periphery distal end portion of the lower segment 12 illustrated in FIG. 8, when the angle θ1x being the upper angle in the shape of the outer peripheral surface S having the symmetrical shape is equal to or more than 2 degrees and equal to or less than 9 degrees, and the angle θ2x being the lower angle is equal to or more than 2 degrees and equal to or less than 9 degrees, in the combination with the upper segment 11 in which the outer peripheral surface S at the outer periphery distal end portion as illustrated in FIG. 6 has an asymmetrical shape, the oil consumption ratio from Example 1 to Example 7 are equal to or less than 82 as compared to the level of Comparative Example 1, which is a preferable result.

From Comparative Example 3, when the outer peripheral shape of the lower segment 12 is the LS1 of Table 2, the angle θ1x being the upper angle is 2 degrees, the angle θ2x being the lower angle is 2 degrees, and the length Lx from the outer periphery vertex to the position away by a distance of 4.0 μm exceeds 0.20 mm, the actual surface pressure P (N/mm²) of Equation (1) becomes smaller, with the result that increase in oil consumption occurs.

From Comparative Example 5, when the outer peripheral shape of the lower segment 12 is the LS7 of Table 2, the angle θ1x being the upper angle exceeds 9 degrees, the angle θ2x being the lower angle is at 9 degrees, the angle difference |θ1x−θ2x| exceeds 1.5 degrees, and the length Lx from the outer periphery vertex to the position away by a distance of 4.0 μm is less than 0.08 mm, the contact length between the inner wall of the cylinder 1 and the outer periphery distal end portion of the segment 11 in the axial direction (Y direction) of the cylinder 1 becomes insufficient, with the result that the action of scraping down the oil becomes poor during the oil ring lowering stroke, and increase in oil consumption occurs.

Reference Example 1 and Reference Example 3 are each a combination of segments in which the outer peripheral surfaces S of the outer periphery distal end portions of the upper segment 11 and the lower segment 12 have the asymmetrical shape. In Reference Example 1, the angle θ1 being the upper angle is less than 3 degrees, and the angle θ2 being the lower angle is less than 9 degrees. In Reference Example 3, the angle θ1 being the upper angle exceeds 9 degrees, and the angle θ2 being the lower angle is 9 degrees. With such level, the oil consumption ratio falls short of the level of Examples. Further, Reference Example 2 is a combination of segments in which the outer peripheral surfaces S at the outer periphery distal end portions of the upper segment 11 and the lower segment 12 have a symmetrical shape. The angle θ1 being the upper angle exceeds 9 degrees, and the angle θ2 being the lower angle exceeds 9 degrees. Further, the difference |θ1X−θ2X| exceeds 1.5 degrees, and the length Lx is less than 0.08 mm. With such level, the oil consumption ratio is worst among all of the tests.

In the embodiment of the present invention, focus is made on the distal end portion of the outer peripheral surface S having a shape which is finely defined within the range of the oil film thickness of the engine oil, that is, the range of 4.0 μm from the outer periphery peak vertex SP in the outer periphery distal end portion of the segments 11 and 12.

Further, in the outer peripheral surfaces S of the segments 11 and 12, when the surface roughness exceeds 0.1 μmRa, damage to the inner wall surface of the cylinder 1 and abrasion of the cylinder 1 are liable to be induced, which is not preferred.

<11. Method of Friction Measurement Test by Motoring Tester>

Figure 14:
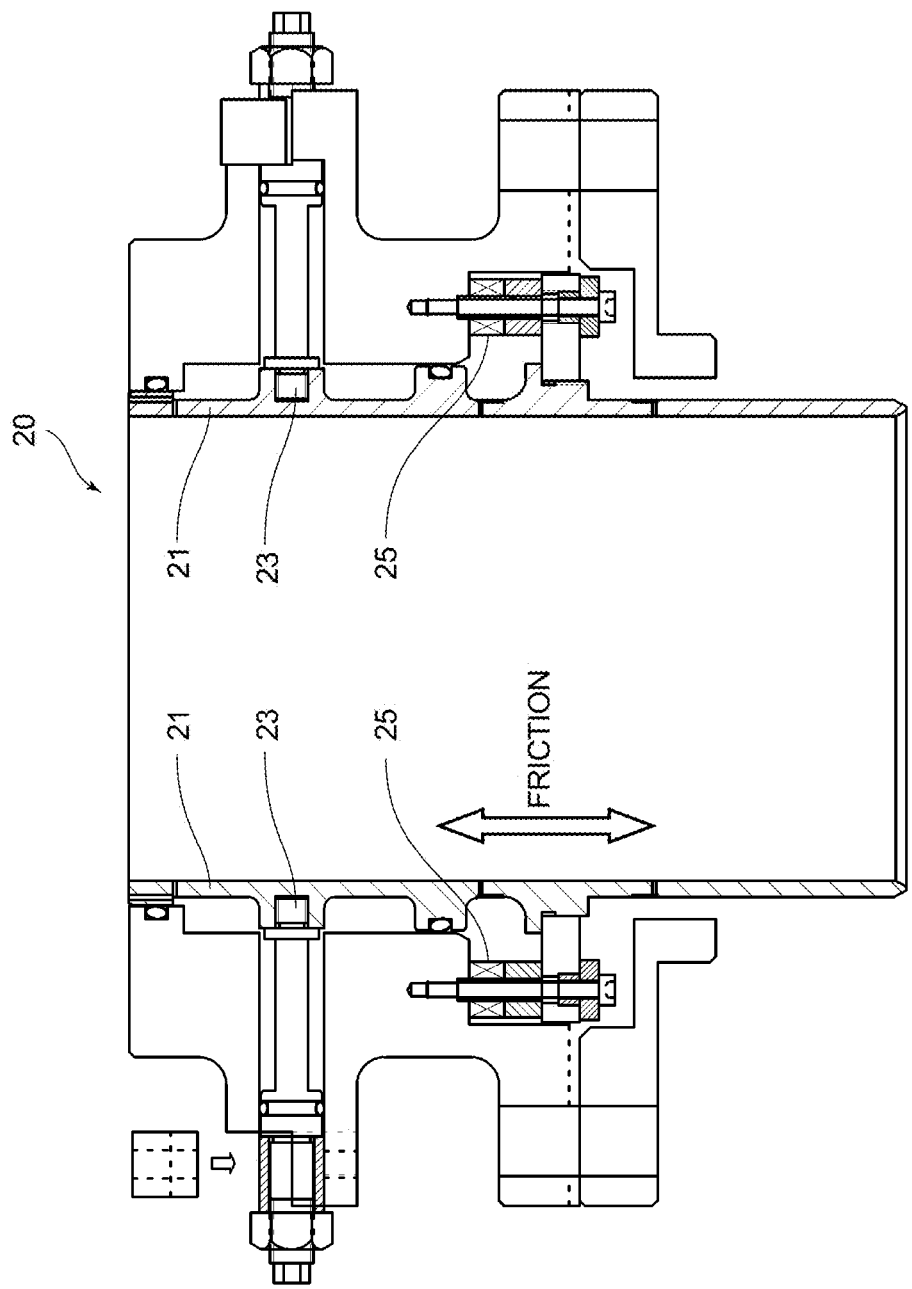
FIG. 14 is a schematic view of a crank-type single-cylinder motoring tester (floating cylinder liner type) used for friction measurement.

The friction measurement test which was conducted with use of the combination oil ring 10 according to this embodiment is described. In the friction measurement test, a crank-type single-cylinder motoring tester (floating liner type) 20 having a bore diameter of 86 mm and a stroke of 86 mm was used. FIG. 14 is a schematic sectional view for illustrating the crank-type single-cylinder motoring tester 20. A cylinder liner 21 is regulated by a stopper 23 in movement in the radial direction, and is movable only in the axial direction. A slide friction force in the axial direction applied to the cylinder liner 21 is detected by a sensor 25 mounted to the cylinder liner 21. Evaluation was conducted with use of a friction mean effective pressure (FMEP) which is obtained by dividing a friction torque of the slide friction force per cycle by a displacement volume.

A cast iron cylinder liner was used as a mating member which slides with a piston ring subjected to evaluation, an inner peripheral slide surface of the cylinder liner 21 was set so as to have an arithmetic average roughness (Ra) of 0.15 μm. As test conditions, the cooling water temperature was set to 80° C., and the temperature of the engine oil was set to 80° C. As the engine oil, GF-50W-20 (grade: ILSAC standard, viscosity class: SAE J300) was used, and the evaluation rotation speed was set between 600 rpm and 2,000 rpm. The lubrication method was a splash method. A cylinder heat was not mounted, and the combustion chamber was open to the atmosphere.

As described above, with regard to the piston ring used in the test, the DLC coating containing only carbon is applied to the outer peripheral surface of the second ring by the arc ion plating method, and the surface roughness was 0.03 μmRa. In this test, in order to prevent the influence on the FMEP due to a change in shape of the outer peripheral slide surface caused by abrasion during the test operation, a DLC (amorphous carbon) coating which is excellent in abrasion resistance and has a small friction coefficient was applied to the outer peripheral surfaces of the top ring and the second ring, and the same rings were used for all of the tests. With regard to the combination oil ring 10, hardening treatment for the outer peripheral surfaces of the segments 11 and 12 and the bore diameter ratio of the oil ring tension are shown in Table 4. The chromium nitride (CrN) coating having a film thickness of 20 μm and a Vickers hardness of 1,100 HV as the surface hardness was used for the outer peripheral surfaces of the segments 11 and 12. As gas nitriding for the outer peripheral surfaces of the segments 11 and 12, the surface hardness having a Vickers hardness of 1,000 HV was used. The surface roughness of the outer peripheral surface is 0.03 μmRa. The bore diameter ratio of the oil ring tension per one cylinder is set within the range of from 0.10 to 0.35 (N/mm). The bore diameter ratio of a total tension per one cylinder of the piston ring is set within the range of from 0.24 to 0.49 (N/mm).

The outer peripheral shapes of the segments 11 and 12 subjected to the test which are shown in Table 4 are as follows.

In Example 8 to Example 12 and Comparative Example 7 to Comparative Example 9, the upper segment 11 in which the outer peripheral surface S of the outer peripheral distal end portion has an asymmetrical shape as illustrated in FIG. 6 (any one of the signs US5 to US6 in Table 1) was used as the upper segment 11, and the lower segment 12 in which the outer peripheral surface S of the outer peripheral distal end portion has a symmetrical convex shape as illustrated in FIG. 8 (any one of the signs LS5 to LS7 in Table 2) was used as the lower segment 12. As the hardening treatment for the outer peripheral surfaces of the segments 11 and 12, gas nitriding was applied to Comparative Example 7, the chromium nitride (CrN) coating was applied to Example 12, Reference Example 4, and Reference Example 6, and the DLC coating was applied in other cases. It is known that a friction coefficient becomes smaller in the order of gas nitriding, the chromiumnitride (CrN) film, and the DLC (amorphous carbon) coating.

In Reference Example 3, Reference Example 4, and Reference Example 7, the sign US5 in which the segment outer periphery distal end portion has an asymmetrical shape was used for both the upper segment 11 and the lower segment 12. In Reference Example 5, Reference Example 6, and Reference Example 8, the sign LS6 in which the segment outer periphery distal end portion has a symmetrical shape was used for both the upper segment 11 and the lower segment 12.

<12. Results of Friction Measurement Test>

Figure 15:
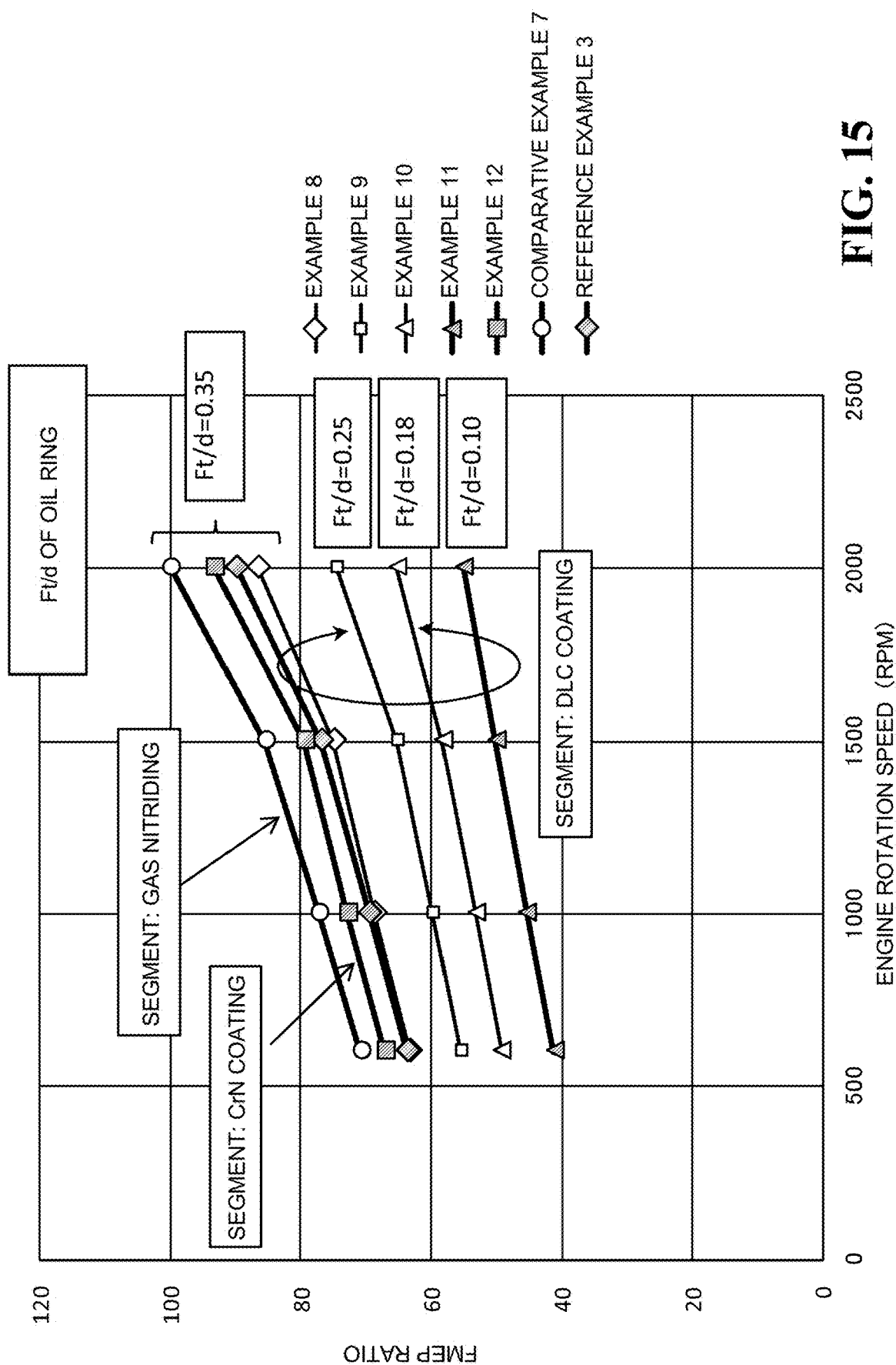
FIG. 15 is a graph for showing a relationship between an engine rotation speed and an FMEP ratio in Example 8 to Example 12, Comparative Example 7, and Reference Example 3 based on Table 4, in which a horizontal axis represents the engine rotation speed, and a vertical axis represents the FMEP ratio.

Results of the friction measurement are shown in Table 4. With regard to the FMEP ratios shown in Table 4, under a condition in which the FMEP of Comparative Example 7 with the engine rotation speed of 2,000 rpm is defined as being 100, other FMEPs are shown by a ratio. FIG. 15 is a graph for showing a relationship between the engine rotation speed and the FMEP ratio in Example 8 to Example 12, Comparative Example 7, and Reference Example 3 based on Table 4. In FIG. 15, the horizontal axis represents the engine rotation speed, and the vertical axis represents the FMEP ratio.

TABLE 4

| | Segment Outer Peripheral Shape | | Hardening Treatment for Segment Outer Peripheral Surface | Oil Ring Tension (Ft)/Bore Diameter (d) (N/mm) | FMEP ratio Engine Rotation Speed (rpm) | | | |
|---|---|---|---|---|---|---|---|---|
| | Upper Segment | Lower Segment | | | 600 | 1,000 | 1,500 | 2,000 |
| Example 8 | US5 | LS6 | DLC Coating | 0.35 | 63 | 69 | 75 | 87 |
| Example 9 | US5 | LS6 | DLC Coating | 0.25 | 56 | 60 | 65 | 75 |
| Example 10 | US5 | LS6 | DLC Coating | 0.18 | 49 | 53 | 58 | 65 |
| Example 11 | US5 | LS6 | DLC Coating | 0.10 | 41 | 45 | 50 | 55 |
| Example 12 | US5 | LS6 | CrN Coating | 0.35 | 67 | 73 | 79 | 93 |
| Comparative Example 7 | US5 | LS6 | Gas Nitriding | 0.35 | 71 | 77 | 85 | 100 |
| Comparative Example 8 | US6 | LS6 | DLC Coating | 0.35 | 65 | 70 | 77 | 88 |
| Comparative Example 9 | US5 | LS7 | DLC Coating | 0.35 | 64 | 70 | 76 | 88 |
| Reference Example 3 | US5 | US5 | DLC Coating | 0.35 | 64 | 70 | 77 | 90 |
| Reference Example 4 | US5 | US5 | CrN Coating | 0.35 | 68 | 74 | 82 | 95 |
| Reference Example 5 | LS6 | LS6 | DLC Coating | 0.35 | 63 | 68 | 74 | 85 |
| Reference Example 6 | LS6 | LS6 | CrN Coating | 0.35 | 67 | 72 | 79 | 90 |
| Reference Example 7 | US5 | US5 | DLC Coating | 0.25 | 56 | 61 | 67 | 77 |
| Reference Example 8 | LS6 | LS6 | DLC Coating | 0.25 | 56 | 60 | 66 | 73 |

Reduction of a tension of the oil ring is most effective for reduction of friction. However, there is a risk of increase in oil consumption. According to the present invention, studies have been conducted with regard to hardening treatment for the outer peripheral surfaces of the segments 11 and 12 and the shapes of the outer peripheral surface distal end, which are capable of reducing the friction even at the same oil ring tension.

At the engine rotation speed of 2,000 rpm, in the test in which the bore diameter ratio Ft/d=0.35 of the oil ring tension Ft and the combination of the outer peripheral shapes of two segments including the upper segment 11 and the lower segment 12 (upper segment 11 of US5 and lower segment 12 of LS6) are the same, with regard to the hardening treatment for the outer peripheral surface, the FMEP is reduced in the order of gas nitriding in Comparative Example 7, the CrN coating in Example 12, and the DLC coating in Example 8, and is effective for reduction of friction. With regard to the FMEP ratio, the gas nitriding in Comparative Example 7 is 100, the CrN coating in Example 12 is 93, and the DLC coating in Example 8 is 87.

At the engine rotation speed of 2,000 rpm, in the test in which the bore diameter ratio Ft/d=0.35 of the oil ring tension Ft and the hardening treatment DLC coating for the two segment outer peripheral surfaces of the upper segment 11 and the lower segment 12 are the same, with regard to the combination of the outer peripheral shapes of the segments 11 and 12, the FMEP is reduced in the order of the combination of the US5 for the upper segment 11 and the US5 for the lower segment 12 in Reference Example 3, the combination of the US5 for the upper segment 11 and the LS6 for the lower segment 12 in Example 8, and the combination of the LS6 for the upper segment 11 and the LS6 for the lower segment 12 in Reference Example 5, and is effective for reduction of friction. With regard to the FMEP ratio, with the gas nitriding in Comparative Example 7 being 100, in the DLC coating, Reference Example 3 is 90, Example 8 is 87, and Reference Example 5 is 85.

At the engine rotation speed of 2,000 rpm, in the test in which the bore diameter ratio Ft/d=0.25 of the oil ring tension Ft and the hardening treatment DLC coating for the two segment outer peripheral surfaces of the upper segment 11 and the lower segment 12 are the same, with regard to the combination of the outer peripheral shapes of the segments 11 and 12, the FMEP is reduced in the order of the combination of the US5 for the upper segment 11 and the US5 for the lower segment 12 in Reference Example 7, the combination of the US5 for the upper segment 11 and the LS'6 for the lower segment 12 in Example 9, and the combination of the LS6 for the upper segment 11 and the LS6 for the lower segment 12 in Reference Example 8, and is effective for reduction of friction. With regard to the FMEP ratio, with the gas nitriding in Comparative Example 7 being 100, in the DLC coating, Reference Example 7 is 77, Example 9 is 75, and Reference Example 8 is 73.

At the engine rotation speed of 2,000 rpm, in the test in which the bore diameter ratio Ft/d=0.35 of the oil ring tension Ft and the hardening treatment CrN coating for the two segment outer peripheral surfaces of the upper segment 11 and the lower segment 12 are the same, with regard to the combination of the outer peripheral shapes of the segments 11 and 12, the FMEP is reduced in the order of the combination of the US5 for the upper segment 11 and the US5 for the lower segment 12 in Reference Example 4, the combination of the US5 for the upper segment 11 and the LS6 for the lower segment 12 in Example 12, and the combination of the LS6 for the upper segment 11 and the LS6 for the lower segment 12 in Reference Example 6, and is effective for reduction of friction. With regard to the FMEP ratio, with the gas nitriding in Comparative Example 7 being 100, in the CrN coating, Reference Example 4 is 95, Example 12 is 93, and Reference Example 6 is 90.

At the engine rotation speed of 2,000 rpm, in the test in which the hardening treatment for the two segment outer peripheral surfaces of the upper segment 11 and the lower segment 12 are the same DLC coating, and in which the combination of the outer peripheral shapes of the two segments including the upper segment 11 and the lower segment 12 (US5 for the upper segment 11 and LS6 for the lower segment 12) are the same, the FMEP is similarly reduced in the order of Example 8 to Example 11 in which the bore diameter ratio Ft/d of the oil ring tension Ft is reduced in the order of 0.35, 0.25, 0.18, and 0.10, and is effective for reduction of friction. With regard to the FMEP ratio, with the gas nitriding in Comparative Example 7 being 100, in the DLC coating, Example 8 is 87, Example 9 is 75, Example 10 is 65, and Example 11 is 55.

With regard to the fuel consumption of the engine, the FMEP at the engine rotation speed up to 2,000 rpm is evaluated.

<13. Consideration about Shapes of Outer Peripheral Surfaces S, Oil Consumption Measurement Test, and Friction Measurement Test>

In terms of oil consumption and friction, the optimum outer peripheral shapes of the segments are in the following ranges. According to Example 1 to Example 12, it is preferred that the outer peripheral shape of the upper segment 11 be formed into an asymmetrical shape with the length L being within the range of 0.05 mm≤L≤0.18 mm, the upper angle θ1 being equal to or more than 3 degrees and equal to or less than 9 degrees, and the lower angle θ2 being equal to or more than 9 degrees. Further, it is preferred that the outer peripheral shape of the lower segment 12 be formed into a symmetrical shape with the length Lx being within the range of 0.08 mm≤Lx≤0.20 mm and values of the upper angle θ1x and the lower angle θ2x being equal to or more than 2 degrees and equal to or less than 9 degrees. Further, it is preferred that the angle θ1x and the angle θ2x of the outer peripheral surface of the lower segment 12 be |θ1x−θ2x|≤1.5 degrees.

Moreover, it is preferred that the outer peripheral shape of the lower segment 12 be formed into a symmetrical shape, with the length Lx being within the range of 0.08 mm≤Lx≤0.18 mm and values of the upper angle θ1x and the lower angle θ2x being equal to or more than 3 degrees and equal to or less than 9 degrees. Further, |θ1x−θ2x|1.5 degrees is given.

<14. Oil Ring Tension and Observation of Oil Consumption Measurement Test and Friction Measurement Test>

The oil ring tension of the combination oil ring is set so as to satisfy two contradicting characteristics of the oil consumption performance and friction performance. With regards to a standard of the oil ring tension, through substitution of a value Ft/d (unit: N/mm) which is obtained by dividing an oil ring tension Ft (unit: N) by a bore diameter d (unit: mm), that is, substitution of an oil ring tension per bore diameter, the conventional standard falls within the range of from 0.5 to 0.6 (N/mm), and it has been considered that the standard of reduction of a tension is equal to or less than 0.35 (N/mm).

For improvement in fuel consumption of the engine, the oil ring tension is reduced. Alternatively, depending on the engine combustion condition or the environment of sliding between the piston ring or the piston 2 and the inner wall of the cylinder 1, scuffing (seizure) or a large number of small scars due to sliding occurs at any one of the sliding surface between the piston ring or the piston 2 and the inner wall of the cylinder 1, it is required that such unfavorable situations be resolved by securing an oil film thickness of equal to or more than a certain amount. For that purpose, it is considered advantageous to reduce the oil ring tension and, in addition, employ a hard film (for example, a chromium nitride film or a DLC film) which is excellent in abrasion resistance and has a small friction coefficient. In such a case, for the upper and lower segments in which the segment outer peripheral shape of the distal end portion is a symmetrical shape, through employment of the present invention, improvement in oil consumption performance or scuff resistance (seizure resistance) with reduction of oil ring tension can be expected.

In the combination oil ring, the outer periphery distal end portions of the upper segment 11 and the lower segment 12 are brought into surface contact with the inner wall of the cylinder 1 in the entire circumference in the circumference direction in all the strokes of the engine, to thereby achieve the predetermined oil consumption performance. However, the cylinder 1 which is inserted in a cylinder block (not shown) of the engine is thermally deformed by the engine combustion, with the result that the inner wall of the cylinder 1 is formed into an inner periphery perfect circle shape from the secondary deformation to the fourth deformation. The thermal deformation further increases in the high-speed region involving high-speed rotation of the engine. Even with respect to such thermal deformation, in order to bring the outer periphery distal end portions of the upper segment 11 and the lower segment 12 into surface contact with the inner wall of the cylinder 1, increase in oil ring tension is advantageous. However, friction loss of the engine increases on one side, and hence increase in oil ring tension is limited. In such a case, with respect to the upper segment and the lower segment in which the segment outer peripheral shape of the distal end portion is a symmetrical shape, through employment of the present invention, improvement in oil consumption performance with suppression of increase in friction using the same oil ring tension can be expected.

Such bore deformation may adversely affect increase in friction of the engine due to sliding between the piston ring or the piston 2 and the inner wall of the cylinder 1 to some extent.

REFERENCE SIGNS LIST

1 . . . cylinder, 2 . . . piston, 3 . . . outer peripheral surface of piston, 4 . . . oil ring groove, 5 . . . oil return hole, 10 . . . combination oil ring, 11 . . . upper segment, 12 . . . lower segment, 11a, 12a . . . hard film, 13 . . . expander spacer, M center line of the expander spacer in axial direction, 14 . . . upper projection portion, 14a . . . upper piece portion, 14b, 15b . . . ear portion, 14b1, 15b1 . . . inclined surface, 14c, 15c . . . outer peripheral support portion, 14d, 15d . . . communication hole, 15 . . . lower projection portion, 15a . . . lower piece portion, a1 . . . first position, b1 . . . second position, a2 . . . third position, b2 . . . fourth position a1x . . . fifth position b1x . . . sixth position, a2x . . . seventh position, b2x . . . eighth position, S . . . outer peripheral surface, S1 . . . first contour section, S2 . . . second contour section, S3 . . . third contour section, SP . . . outer periphery vertex, 20 . . . crank-type single-cylinder motoring tester, 21 . . . cylinder liner, 23 . . . stopper, 25 . . . sensor (for detecting slide friction force in axial direction).

The invention claimed is:

1. A combination oil ring, which is to be mounted to an oil ring groove of a piston for an internal combustion engine, the combination oil ring comprising:
  a pair of segments each having an outer peripheral surface which slides on a cylinder inner wall; and
  an expander spacer, which is arranged between the pair of segments, and is configured to press outer peripheral surfaces of the pair of segments against the cylinder inner wall,
wherein a shape of the outer peripheral surface of an upper segment of the pair of segments which is arranged on the engine combustion chamber side in any longitudinal section has a curved shape, which is formed of a pair including the engine combustion chamber side and a side away from the engine combustion chamber in an upper segment width direction and is symmetrical over a radial direction extending from end points at outer peripheral side end portions of two surfaces forming the upper segment width to the cylinder inner wall respectively, and the outer periphery vertex side of the shape of the outer peripheral surface to be brought into contact with the inner wall of the cylinder at the time of insertion has an asymmetrical shape in the upper segment width direction over the outer periphery vertex, and extensions at both ends of the asymmetrical shape have a shape continuous to the curved shape having the outer peripheral side end portions of the two surfaces forming the upper segment width as end points,
wherein the asymmetrical shape has a first intermediate line being a line passing through a center of an upper segment width, and, in an outer periphery distal end portion of a contour curve which is obtained by tracing the outer peripheral surface of the upper segment in the longitudinal section, when a position on the engine combustion chamber side of two positions on the contour curve at a position away by a distance of 4.0 µm from an outer peripheral vertex from the outer periphery vertex toward the inner peripheral side in the upper segment radial direction is a first position (a1), a position on the side away from the engine combustion chamber is a second position (b1), a length of a line segment between the first position a1 and the second position b1 is L, and an intermediate line of the line segment having the length L is a second intermediate line, the second intermediate line is positioned on the side away from the engine combustion chamber with respect to the first intermediate line, and an outer periphery vertex of the upper segment is positioned on the second intermediate line or on the side away from the engine combustion chamber with respect to the second intermediate line,
wherein the upper segment is mounted to the oil ring groove so that the outer periphery vertex is positioned on the side away from the engine combustion chamber,
wherein a shape of the outer peripheral surface of a lower segment of the pair of segments which is arranged on the side away from the engine combustion chamber in any longitudinal section has a curved shape, which is formed of a pair including the engine combustion chamber side and the side away from the engine combustion chamber in a lower segment width direction and is symmetrical over a radial direction extending from end points at outer peripheral side end portions of two surfaces forming the lower segment width to the cylinder inner wall respectively,
wherein the outer periphery vertex side of the shape of the outer peripheral surface to be brought into contact with the inner wall of the cylinder at the time of insertion has an arc shape which is symmetrical in the lower segment width direction over the outer periphery vertex, wherein extensions at both ends of the arc shape have a shape continuous to the curved shape having the outer peripheral side end portions of the two surfaces forming the lower segment width as end points, and the lower segment is attached to the oil ring groove, wherein, when the contour curve having the asymmetrical shape in the upper segment outer periphery distal end portion is divided into two regions including a contour curve portion which extends toward the inner peripheral side in the upper segment radial direction and is sandwiched between the outer periphery vertex and a position away from the outer periphery vertex by a distance of 1.5 µm and a contour curve portion which extends toward the inner peripheral side in the upper segment radial direction and is sandwiched by a distance of 1.5 µm and a distance of 4.0 µm from the outer periphery vertex, the contour curve has a first contour section, a second contour section, and a third contour section in the stated order from the engine combustion chamber side of the cylinder, and the first contour section is provided at a part of a linear shape or a quadratic curve shape starting from a first end portion on the engine combustion chamber side of the second contour section, and the second contour section is provided so as to be an arc shape and has an outer periphery vertex at a halfway portion thereof, and the third contour section is provided so as to be part of the quadratic curve shape starting from the second end portion of the second contour section on the side away from the engine combustion chamber, wherein a surface roughness of an asymmetrical shape portion of the outer peripheral surface of the upper segment is equal to or less than 0.1 µmRa, wherein, in an outer periphery distal end portion of the contour curve, of two positions on the contour curve at a position away from the outer periphery vertex by a distance of 1.5 µm toward the inner peripheral side in the upper segment radial direction, a position on the engine combustion chamber side is a third position (a2), a position on the side away from the engine combustion chamber is a fourth position (b2), and a length L of the line segment between the first position a1 and the second position b1 falls within a range of 0.05 mm≤L≤0.18 mm, wherein, when an angle (upper angle) formed between a first straight line passing through the first position a1 and the third position a2 and an axial direction of the cylinder is θ1 degrees, and an angle (lower angle) formed between a second straight line passing through the second position b1 and the fourth position b2 and the axial direction of the cylinder is θ2 degrees, conditions of 3 degrees≤θ1≤9 degrees and 9 degrees≤θ2 are satisfied, wherein, of the outer peripheral surface of the lower segment, a surface roughness of the symmetrical portion which extends from the outer periphery vertex at least by a distance of 10 µm toward the inner peripheral side in the lower segment radial direction is equal to or less than 0.1 µmRa, wherein, in the outer periphery distal end portion of the contour curve which is obtained by tracing the outer peripheral surface of the lower segment in the longitudinal section, of two positions on the contour curve at a position away by a distance of 4.0 µm from the outer periphery vertex toward the inner peripheral side in the lower segment radial direction, a position on the engine combustion chamber side is a fifth position (a1x), and a side on the side away from the engine combustion chamber is a sixth position (b1x), and, of two positions on the contour curve at a position away by a distance of 1.5 µm from the outer periphery vertex toward the inner peripheral side in the lower segment radial direction, a position on the engine combustion chamber side is a seventh position (a2x), and a position on the side away from the engine combustion chamber is an eighth position (b2x), and a length of a line segment between the fifth position a1x and the sixth position b1x is Lx, the length Lx falls within the range of 0.08 mm≤Lx≤0.20 mm, and wherein, when an angle (upper angle) formed between a first straight line passing through the fifth position a1x and the seventh position a2x and the axial direction of the cylinder is θ1x degrees, and an angle (lower angle) formed between a second straight line passing through the sixth position b1x and the eighth position b2x and the axial direction of the cylinder is θ2x degrees, conditions of 2 degrees≤θ1x≤9 degrees, 2 degrees≤θ2x≤9 degrees, and |θ1x−θ2x|≤1.5 degrees are satisfied.

2. A combination oil ring according to claim 1, wherein, at the outer periphery distal end portion of the contour curve obtained by tracing the outer peripheral surface of the lower segment in the longitudinal section, the length Lx falls within the range of 0.08 mm≤Lx≤0.18 mm, and conditions of 3 degrees≤θ1x≤9 degrees, 3 degrees≤θ2x≤9 degrees, and |θ1x−θ2x|≤1.5 degrees are satisfied.

3. A combination oil ring according to claim 1, wherein the outer peripheral surface of each of the pair of segments includes a coating of any one of:
(1) a coating made of chromium nitride, the coating having a surface hardness of equal to or more than 800 HV and a thickness of equal to or more than 10 µm;
(2) a DLC (amorphous carbon) coating made of only carbon, the DLC coating having a surface hardness of equal to or more than 1,500 HV and a thickness of equal to or more than 3 µm; and
(3) a multi-layer structure coating including the hard coating of (1) and the DLC coating of (2) layered on the hard coating, the coating of the chromium nitride coating (PVD coating) having a thickness of equal to or more than 5 µm, and the coating of the DLC coating having a thickness of equal to or more than 0.5 µm.

* * * * *